(12) United States Patent
Borns

(10) Patent No.: US 9,719,485 B2
(45) Date of Patent: Aug. 1, 2017

(54) BUOYANCY-DRIVEN POWER GENERATION SYSTEM

(71) Applicant: Fawcett Co., Inc., Richfield, OH (US)

(72) Inventor: Peter J. Borns, Olmsted Falls, OH (US)

(73) Assignee: Fawcett Co., Inc., Richfield, OH (US)

( * ) Notice: Subject to any disclaimer, the term of this patent is extended or adjusted under 35 U.S.C. 154(b) by 0 days.

(21) Appl. No.: 14/776,129

(22) PCT Filed: Mar. 13, 2014

(86) PCT No.: PCT/US2014/026222
§ 371 (c)(1),
(2) Date: Sep. 14, 2015

(87) PCT Pub. No.: WO2014/151672
PCT Pub. Date: Sep. 25, 2014

(65) Prior Publication Data
US 2016/0146180 A1 May 26, 2016

Related U.S. Application Data

(60) Provisional application No. 61/798,512, filed on Mar. 15, 2013.

(51) Int. Cl.
*H02N 11/00* (2006.01)
*F03B 17/02* (2006.01)
(Continued)

(52) U.S. Cl.
CPC ............ *F03B 17/02* (2013.01); *F03B 17/005* (2013.01); *H02K 7/1807* (2013.01); *H02K 99/10* (2016.11); *F03B 17/04* (2013.01); *Y10S 415/916* (2013.01)

(58) Field of Classification Search
CPC ....................................................... H02N 11/00
(Continued)

(56) References Cited

U.S. PATENT DOCUMENTS

| 29,149 A | 7/1860 | Durham |
| 2,135,110 A | 11/1938 | Platt |

(Continued)

FOREIGN PATENT DOCUMENTS

| GB | 2190965 | 12/1987 |
| GB | 2385384 | 8/2003 |

(Continued)

OTHER PUBLICATIONS

Dulpichet Rerkpreedapong, "Field Analysis and Design of a Moving Iron Linear Alternator for Use with Linear Engine," 1999.

*Primary Examiner* — Tulsidas C Patel
*Assistant Examiner* — Joseph Ortega
(74) *Attorney, Agent, or Firm* — Hahn Loeser & Parks LLP; Bret A. Hrivnak

(57) ABSTRACT

Apparatus and methods of generating electricity using buoyancy principles, a buoyancy-driven power generation system comprising a closed-loop passage defined by a surrounding structure, the closed-loop passage arranged vertically to extend longitudinally along a closed-loop path, the passage configured to retain a liquid, a plurality of rotor-vessels slidingly arranged within the closed-loop passage and configured to translate along the closed-loop path within the closed-loop passage, each of the plurality of rotor-vessels including a fluid-retention cavity formed in a body of the rotor-vessel and having a density greater than a liquid in which the plurality of rotor-vessels will be submerged for power generation operations.

25 Claims, 20 Drawing Sheets

(51) Int. Cl.
*H02K 7/18* (2006.01)
*F03B 17/00* (2006.01)
*H02K 99/00* (2014.01)
*F03B 17/04* (2006.01)

(58) Field of Classification Search
USPC ........................................................ 290/1 R
See application file for complete search history.

(56) References Cited

U.S. PATENT DOCUMENTS

| | | | |
|---|---|---|---|
| 3,273,001 A | 9/1966 | Baermann | |
| 3,754,147 A | 8/1973 | Hancock et al. | |
| 3,859,789 A * | 1/1975 | Fawcett | H02K 44/00 418/33 |
| 3,934,964 A | 1/1976 | Diamond | |
| 3,938,337 A * | 2/1976 | Fawcett | H02K 44/00 290/2 |
| 4,038,826 A * | 8/1977 | Shaw | F03B 17/02 417/5 |
| 4,054,031 A | 10/1977 | Johnson | |
| 4,114,046 A | 9/1978 | Yousef | |
| 4,326,132 A | 4/1982 | Bokel | |
| 4,335,093 A | 6/1982 | Salomon | |
| 4,363,212 A | 12/1982 | Everett | |
| 4,498,294 A | 2/1985 | Everett | |
| 4,718,232 A | 1/1988 | Willmouth | |
| 4,981,015 A | 1/1991 | Simpson | |
| 5,001,357 A | 3/1991 | Adams | |
| 5,555,728 A | 9/1996 | Welch, Jr. | |
| 6,734,574 B2 * | 5/2004 | Shin | F03B 17/04 290/1 R |
| 6,918,350 B1 | 7/2005 | Morse | |
| 6,978,610 B2 | 12/2005 | Carnahan | |
| 6,990,809 B2 | 1/2006 | Abouraphael | |
| 2005/0091974 A1 | 5/2005 | Carnahan | |
| 2011/0156407 A1 | 6/2011 | Dorozenski et al. | |
| 2012/0060490 A1 * | 3/2012 | Abdalla | F03B 17/005 60/496 |
| 2012/0274079 A1 * | 11/2012 | McCoy | H02K 7/1823 290/1 R |

FOREIGN PATENT DOCUMENTS

| | | | |
|---|---|---|---|
| WO | 03076798 | 9/2003 | |
| WO | WO 03076798 A1 * | 9/2003 | F03B 17/04 |
| WO | 2008006921 | 1/2008 | |
| WO | 2008082221 | 7/2008 | |

* cited by examiner

BUOYANCY-DRIVEN POWER GENERATION SYSTEM

This application is a National Stage application of International Application No. PCT/US2014/026222, filed Mar. 13, 2014, and claims priority to, and the benefit of, U.S. Provisional Patent Application No. 61/798,512, filed Mar. 15, 2013 with the U.S. Patent Office, and which is hereby incorporated by reference.

BACKGROUND OF THE INVENTION

Field of the Invention

This invention relates generally to the use of a density differential between different fluids (i.e., buoyancy principles) to generate power, and more specifically, to the use of buoyancy principles to generate power and drive transportation vehicles.

Description of the Related Art

Presently, there is a movement to reduce the worldwide reliance on fossil fuels for power generation. For example, there has been an increase in the development and employment of wind and solar power generation devices. These sources, however, are not without particular drawbacks.

For example, with wind power generation, the production of electricity is dependent upon the existence of wind, which is often inconsistently available in many regions of the world. Accordingly, when wind is unavailable, there is no sufficient means for generating energy. And when wind is available, there is no satisfactory means for storing this production for later use, such as when wind is unavailable. Further, the transmission of electrical current from wind generation sources to a point of use may result in waste due to transmission losses and may raise regulatory issues when transmitting electrical power over various real property. Similar issues also arise with solar power generation since solar power generation is most productive when sunlight is not filtered by clouds.

Further, there are many industrial operations that create byproducts that are not fully utilized, such as internal combustion engine exhaust, discharged\compressed air, steam, and various waste gases that are currently released to the atmosphere, which results in potential energy waste and environmental concerns. It would be beneficial if a power generation system could re-utilize these waste by-products for the generation of power.

The present invention utilizes buoyancy principles to provide a buoyancy-driven power system for the creation of electric power. Other aspects of the invention include methods for utilizing exhaust gases and other byproducts from various industrial processes to further create power using buoyancy-driven power systems. Still other aspects of the invention include providing a buoyancy-driven power system that also reduces the release of emissions and pollutants though the passive filtration system in a buoyancy-driven power system and/or provides a means of hydrogen gas production and other the production of other constituents of water, including but not limited to alcohol (OH), hydrogen peroxide ($H_2O_2$), and oxygen (e.g., O, $O_2$, or $O_3$) without direct use of fossil fuels. It is understood that this invention may be employed to generate electric power for any other application that may utilize electric power.

SUMMARY OF THE INVENTION

Particular embodiments of the present invention include systems and methods which utilize the benefits of buoyancy to generate electric power. Particular embodiments of the present invention include a buoyancy-driven power generation system comprising a closed-loop passage defined by a surrounding structure, the closed-loop passage arranged vertically to extend longitudinally along a closed-loop path, the passage configured to retain a liquid, a plurality of rotor-vessels slidingly arranged within the closed-loop passage and configured to translate along the closed-loop path within the closed-loop passage, each of the plurality of rotor-vessels including a fluid-retention cavity formed in a body of the rotor-vessel and having a density greater than a liquid in which the plurality of rotor-vessels will be submerged for power generation operations, a plurality of magnets and a plurality of wire coils arranged along the closed-loop passage and configured to generate a flow of current as the plurality of rotor-vessels translate along the closed-loop passage, a gas inlet arranged near a bottom of the closed-loop passage, the gas inlet both configured for operable communication with a gas source and to dispense a gas received from the gas source into a bottom of closed-loop passage for reception by each of the plurality of fluid-retention rotor-vessels.

Particular embodiments of the present invention include methods of generating electricity using buoyancy principles, the method comprising providing the system enumerated in the paragraph above, at least partially filling the closed-loop passage with a liquid, injecting a fluid into a bottom location of the closed-loop passage, the fluid entering a fluid-retention cavity within the rotor-vessel such that the rotor-vessel translates vertically along the closed-loop path until reaching a top location of the closed-loop path, where the rotor-vessel translates downwardly along the closed-loop path after discharging the fluid from the fluid-retention cavity of the rotor-vessel, and repeating the prior step for the other rotor-vessels of the plurality of rotor-vessels such that the plurality of rotor-vessels translate along the closed-loop passage to thereby generate a flow of electric current in the plurality of coils.

The foregoing and other objects, features and advantages of the invention will be apparent from the following more detailed descriptions of particular embodiments of the invention, as illustrated in the accompanying drawings wherein like reference numbers represent like parts of the invention.

BRIEF DESCRIPTION OF THE DRAWINGS

FIG. 1A shows a side elevation view of the system shown in FIG. 1.

DETAILED DESCRIPTION OF THE INVENTION

Particular embodiments of the present invention provide a buoyancy-driven power system, which utilizes the benefits of buoyancy to generate electric power. According to Archimedes' principle, a floating object is an object that displaces an amount of fluid equal to the weight of the floating object. The weight of the displaced fluid is equal to the density of the fluid multiplied by the submerged or displaced volume. Accordingly, for fully submerged objects with equal masses, objects having a greater volume are more buoyant.

Figure 1:
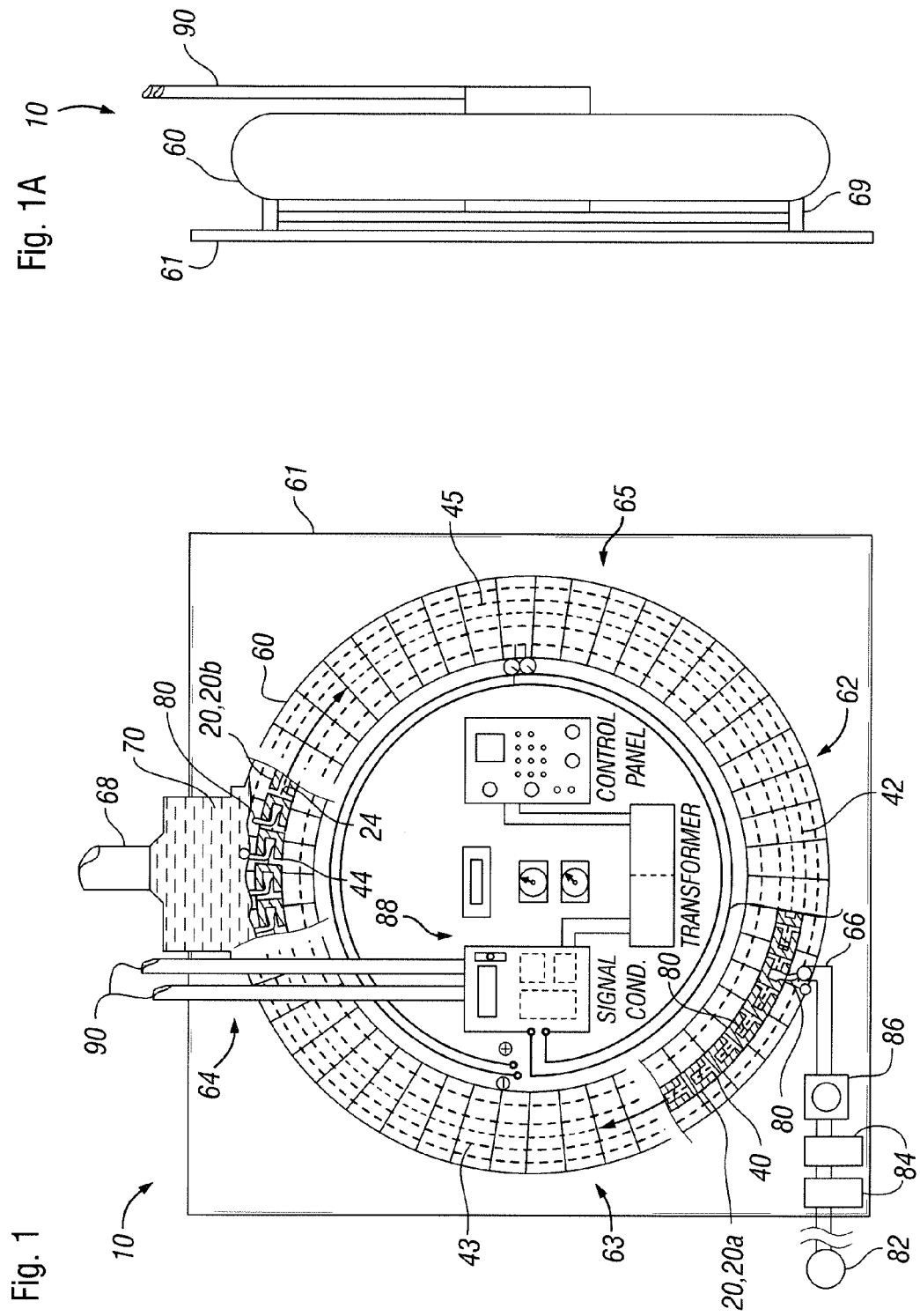
FIG. 1 is a front elevation view of a buoyancy-driven power system, according to a particular embodiment of the invention.
Figure 2:
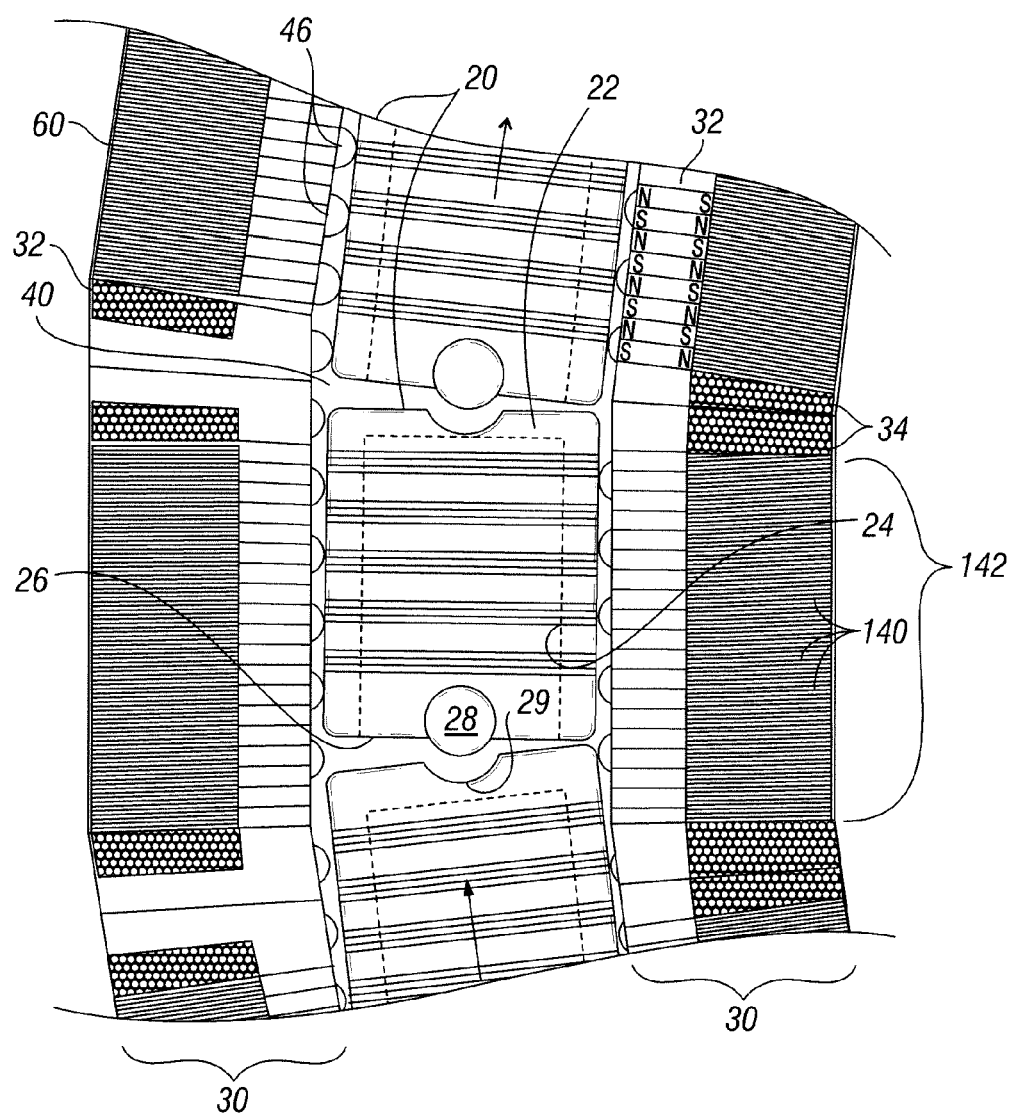
FIG. 2 shows a side sectional view of the system shown in FIG. 1.

With reference to an exemplary embodiment shown in FIGS. 1 and 2, a buoyancy-driven power generation system 10 is generally shown for generating electricity by converting mechanical energy (by use of buoyancy principles) into electrical energy. To facilitate use of buoyancy principles, a closed-loop passage 40 (also referred interchangeably herein as "path") is arranged within a housing 60 containing liquid through which fluid-retention vessels 20 rise and fall due to buoyancy principles. Because system 10 operates as a generator, the plurality of fluid-retention vessels 20 operate as rotors (which are interchangeably referred to herein as "vessels" or "rotor vessels") configured to translate about the closed-loop passage 40 within housing 60 (which generally operates as the stator). Electricity generation arises within system 10 due to the relative translation of the rotor-vessel 20 moving relative one or more of the magnetic fields and the magnetically conductive stator plates, which results in a flow of electrons through the wire coil arranged perpendicular to the magnetic field(s). In the exemplary embodiment shown, with reference now to FIG. 2, rotor-vessels 20 are shown arranged within a closed-loop passage 40 arranged within a stator 30 comprising plurality of magnets 32 positioned statically along the closed-loop passage 40 to create a magnetic field and a plurality of wire coils 34 wound about one or more stator plates 140, the wire coils being wound in a direction perpendicular to the longitudinal direction of the passage (that is, the direction in which the rotor-vessels translate). For example, with reference to FIG. 2, each coil is shown in cross-section, where cross-sectioned portions of each coil 34 wound about a stator plate stack 142 are shown above and below each stack. The phrase "along the closed-loop passage" does not necessarily indicate that the magnets are contained within or in contact with the closed-loop passage, but rather the magnets are arranged along a length of the closed-loop path such that the magnetic field created by the magnets extends into the closed-loop passage, such as when the magnets are arranged within the structure surrounding the passage ("surrounding structure"), such as within the plates 140 or more generally within the housing 60. Furthermore, the rotor-vessels 20 includes a structure formed of magnetically conductive material, which may comprise any material suitable for its intended purpose, such as iron or steel, to allow the flow of magnetic flux within the one or more wire coils 34 statically positioned within the housing (wire coils 34 are shown wound perpendicular to the passage 40 and about a stack 142 of magnetically conductive plates 140, according to an exemplary embodiment). It is understood that magnets, as used herein, may comprise any magnetized object, including, without limitation, any permanent magnet or electromagnetic field coil. As with any generator, in other embodiments, the magnets may instead be placed within the rotor (for movement within the system) and the iron core or wire coil remains fixed within in the stator.

With continued reference to an exemplary embodiment in FIG. 1, housing 60 includes a liquid 70 within which the closed-loop passage 40 is at least partially submerged to facilitate the rise of rotor-vessels 20 due to buoyancy principles. A fluid inlet 66 is positioned along a bottom portion 42 of passage 40 below a rise portion 43 and a fall portion 45 of the passage 40 (as well as being positioned along a bottom portion 62 of the housing 60 below a rise portion 63 and a fall portion 65 of the housing 60). Fluid 80, after being dispensed from the fluid inlet 66, rises within liquid 70 until such fluid enters a fluid-retention cavity 24 within an inverted rotor-vessel 20a. Once a sufficient volume of fluid of a particular density is contained within a fluid-retention cavity 24 of the rotor-vessel 20, the rotor-vessel rises according to buoyancy principles until reaching a top portion 44 of the passage (shown to be arranged at a top portion 64 of the housing). For fluid 80 to rise within housing 60, fluid 80 is of less density than liquid 70. Therefore, fluid 80 comprise any desired liquid or gas that is of lesser density that any desired liquid 70. In particular embodiments, liquid 70 is water and fluid 80 is a gas, such as atmospheric air or exhaust or waste air, which may contain pollutants or other impurities.

With general reference to FIGS. 1 and 2, as the rotor-vessel 20 rises in the rise portion 43 of the closed-loop passage 40, relative translation is achieved between the magnetically conductive rotor-vessels 20 and static magnets and coils arranged along closed-loop passage 40. The relative translation between of the magnetically conductive rotor-vessels 20, the static magnets 32 and coils 34 arranged along the passage 40 generates a flow of electrons (a flow of electric current) through the coils to induce electricity. The electricity is transferred from system 10 via output transmission line 90 for ultimate storage or consumption, after any desired conditioning and transformation of the electricity.

Upon reaching a top portion 64 of the housing 60 and of the closed-loop passage 40, the rotor-vessels discharge the fluid 80 previously retained within a fluid-retention cavity for the purpose of continuing translation of the rotor-vessels 20 downward along the fall portion 45 of the closed-loop passage and toward housing bottom 62 to again receive fluid 80 from inlet 66 and thereby begin a new rotational cycle around the closed-loop passage. Once reaching the top of the closed-loop passage, the arrangement of each rotor-vessel transforms from the inverted arrangement 20a to an upright arrangement 20b as each rotor-vessel translates downwardly along the closed-loop passage. In addition to buoyancy forces, gravitational forces also pull the rotor-vessels downwardly along the closed-loop passage. The liquid 80 discharged from the rotor-vessels 20 may be recovered and discharged through a liquid outlet 68. In particular embodiments, the liquid 80 recovered is communicated from outlet 68 to inlet 66 for re-use and subsequent discharge from inlet 66.

It is understood that the closed-loop passage 40, and therefore the housing 60, may form any desired closed-loop shape. In the embodiment shown in FIG. 1, for example, the closed-loop passage and housing generally extend longitudinally in a circular path, and generally form an annulus. In other exemplary embodiments, each may be ovular (oval-shaped)—in lieu of being circular. Being oval shaped includes having linear segments associated with rise and fall portions 43, 45 of the passage (and like portions 63, 65 of housing) extending between arcuate segments forming top and bottom curvilinear portion 44, 42, respectively (and like portions 64, 62 of housing). It is understood that housing 60 may be formed of any suitable material with the electrical properties capable of retaining a desired liquid and serving as a stator of the system 10, such as acrylic or Plexiglas, for example. The exemplary housing 60 is shown in a side-elevation view in FIG. 1A shown attached to a backing member 61 to form a unit.

It is understood that the closed-loop passage along which one or more rotor-vessels translate may comprise a passage formed by any desired structure configured to translate the rotor-vessels in a closed-loop path. In particular embodiments, for example, with reference to FIG. 1, a closed-loop passage 40 is be formed by a plurality of surrounding structure defining a cavity extending in a closed-loop path. The surrounding structure may comprise the housing 60, for example, or any structure between the housing and the passage as is generally shown in FIG. 1 according to an exemplary embodiment. By further example, the closed-loop passage may be formed by a tube or pipe. In yet further examples, the closed-loop passage may be formed by a track to which the rotor-vessel is operably constrained (that is, constrained directly or indirectly) for translation along the track. For example, the track may comprise a recess or a protrusion extending longitudinally in a closed-loop path, the rotor-vessel being operably constrained (such as by attachment or engagement, such as by slot and groove) to the track to translate along the track in a closed-loop path. It is understood that multiple tracks may be employed to constrain a single vessel, which may assist in stabilizing and controlling the translation of the vessel along a single closed-loop passage.

It is understood that in particular embodiments, system 10 may include multiple closed-loop passages, which may be arranged within a single or multiple housings. In such embodiments, the multiple closed-loop passages may be arranged concentrically, or laterally offset by any desired distance whereby each generally extend within independent, parallel planes. Furthermore, it is understood that separate, different rotor-vessels may be arranged in each of the multiple closed-loop passages.

To facilitate translation along the closed-loop passage, in any embodiment, rotor-vessel is configured to translate along the closed-loop passage. In doing so, static structure, such as sliding surfaces, or rotatable members may be provided to reduce the friction between the vessel and the structure defining the close-loop passage. For example, a sliding interface or slideable attachment may be provided, where, for example, one or more low friction or frictionless surfaces are arranged between the vessel and the closed-loop passage (either on the vessel or on the surrounding structure defining the passage). By further example, repulsion forces (such as forces produced by magnetic levitation principles) may be directed to or from the vessel from a repulsion force source to facilitate slideable translation between the cup and the closed-loop passage. By further example, in particular embodiments, one or more translatory members may be employed. For example, with reference to FIG. 2, a plurality of bearings 46 are arranged along the surrounding structure between said structure and the vessel to facilitate translation by reducing translational friction there between. Bearing are shown to be rotatable bearings, which are referred to herein to comprise any ball, roller, spherical, linear, roller or pin bearings, castors, or other member configured to rotate. In other variations, bearings may comprise any other bearing mechanism, including spring plungers, mechanical slides, bearing compositions, magnetic bearings and air or water bearings. Accordingly, the rotatable bearing maybe operably attached to the vessel or the surrounding structure defining the closed-loop passage. It is understood that any other means of facilitating translation of a rotor-vessel relative the closed-loop passage may be employed in other embodiments of self-powered, fixed-path applications.

Figure 19:
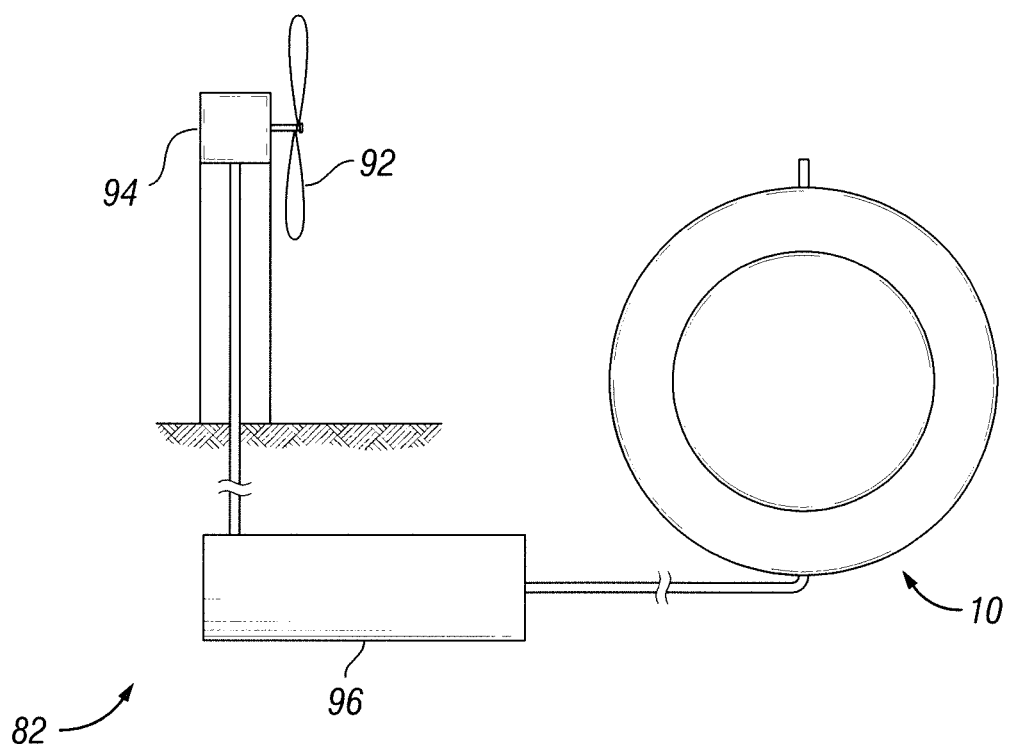
FIG. 19 is a side view of an exemplary application of the buoyancy-driven system showing generally represented by FIG. 1, the system in operable communication with a fluid pressurization holding tank, which is in operable communication with a wind turbine.

Fluid (interchangeably referred to herein as "vessel-driving fluid") is supplied by a fluid source. The fluid source may comprise any source capable of supplying a desired fluid for injection into the closed-loop passage of the buoyancy-driven power generation system. For example, vessel-driving fluid may be supplied from an industrial process (or may be supplied for use in an industrial process after use in the buoyancy-driven power generation system), or other industrial source providing an industrial waste liquid or gas, which may be heated (whether as supplied or subsequently heated from to injection into the closed-loop path) to provide improve buoyancy capabilities. By further example, pressurized gas such as air may be supplied by a trompe, that is gas that has been drawn down into a below water level chamber in which the gas is entrapped, that is subsequently pressurized under the head of water positioned there above. Ocean waves or other hydraulic sources may be employed in certain embodiments. By still further example, with reference to FIG. 19, fluid source 82 is a wind turbine 92 that utilizes a compressor 94 to compress any gas that is stored within tank 96. The compressor may be arranged external to the turbine, or within the turbine, where the generator normally driven by the turbine is substituted with the compressor.

It is also understood that solar energy, via collectors and/or cells, may provide a heated and/or pressurized source of fluid. For example, solar energy may be used to heat air or other gases to lower its density. Solar energy may also be used to drive a compressor to pressurize air or other gases or to create a vacuum source, which may be stored for later consumption by the buoyancy-driven power generation system. In lieu of solar, geothermal energy and/or energy created by chemical reactions (e.g., by mixing baking soda and vinegar) may also be used. By using a power source that may not be consistently available or predictable, such as wind and solar power, the sources, when present, may compress fluid for later use, such as when the source is inoperable or non-existent. Further, pressurized fluid is more efficiently transferred than electricity. A fluid storage device (such as a tank) or fluid generating device (such as a pump or compressor) may also be used to supply atmospheric air or other gases to the buoyancy-driven power generation system.

It is also understood that the fluid provided for use in the buoyancy-driven power generation system may be processed. In particular embodiments, as exemplarily shown in FIG. 1, any known filter or scrubber (collectively referred to as 84) may be employed to remove any desired materials, impurities, contaminants, or pollutants prior to or subsequent to entry of the fluid 80 into the housing 60. Such a filter or scrubber may comprise any filter, scrubber, or other means for cleaning or removing any desired materials, impurities, contaminants, or pollutants from the fluid being discharged into housing via inlet 66, such as carbon-dioxide, or from the liquid 70 retained within housing 60. For example, electrostatic, ozonators, or electrolysis may be employed. By further example, a small micron filter may be positioned outside or within housing 10 to filter liquid 70 and/or fluid 80. In yet another example, any known wet scrubbing technology may be employed to remove toxic or other unwanted gases within any fluid 70 and/or liquid 80. For example, such technology may employ limestone to remove hydrogen sulfide from water, for example. Therefore, contaminated liquids and gases recovered from manufacturing operations, for example, may be injected into system as fluid 80 (but also employed as liquid 70) to facilitate buoyancy forces, but which may also be cleaned within system 10 to provide a clean product.

As discussed, the vessel-driving fluid discharged from fluid inlet, and injected into the closed-loop passage, may be regulated or pressurized (e.g., see regulator 86 in FIG. 1). In particular embodiments, fluid is pressurized to at least 3 pounds per square inch (psi) or to a pressure greater than the ambient water pressure at depth where it is released. In other embodiments, the fluid is pressurized between 10-20 psi. The fluid may be pressurized after it is received from a fluid source, or it may be pressurized prior to receipt, by any pressurization source or device, such as a pump or compressor, for example.

Ultimately, after discharge from a rotor-vessel, the fluid exits the closed-loop passage and even, in particular instances, the housing. It is understood that the discharged fluid may be reclaimed and reused in the buoyancy-driven power system for injection into another rotor-vessel at the inlet, or may be released to atmosphere or redirected for some other use. For example, with reference to the embodiment of FIG. 1, discharged fluid 80 exit is collected and discharged from the housing 60 at outlet 68. The reclaimed fluid may be communicated to inlet 66 from outlet 68 by any known method or mechanism. It is understood that a vacuum source may be placed in fluid communication with the housing outlet 68 to assist in drawing fluid from the housing. The vacuum source may comprise any known vacuum source, such as, for example, any known pump or compressor.

Upon generation of electric current, electricity is then conducted via wires to any desired device, such as a signal conditioner, transformer, watt & ampere meters, inverters, battery\capacitor storage systems and\or directly to a utility grid or customer end user (e.g., see generally 88 in FIG. 1). To increase the effects of buoyancy, the closed-loop passage length may be increased and additional for the purpose of adding additional rotor-vessels and additional magnets and wire coils. Further, buoyancy effects may be increased by providing rotor-vessels having larger fluid-retention cavities, and/or grouping or ganging together multiple rotor-vessels.

In particular embodiments, system 10 is capable of performing electrolysis when the liquid contained within the closed-loop passage comprises water and/or a salt solution in whole or in part. Electrolysis may be employed to filter the liquid by separating any unwanted materials, impurities, contaminants, or pollutants from the liquid for removal, each of which may have been originally supplied within the liquid or which may have been injected into the housing with the vessel-driving fluid. Electrolysis may also be employed to generate supplies of hydrogen and oxygen for later use and consumption. Hydrolysis, which generates hydrogen as a byproduct, may also be employed to create hydrogen for later use.

In particular embodiments, electrolysis is performed using the current generated by the rotor-vessels and wire coils. Electrolysis breaks down water into hydrogen and oxygen and other constituents contained within the water, which can then be collected for any desired use. In operation, electrolysis is achieved by applying a voltage across two electrodes, namely, an anode (positive electrode) and a cathode (negative electrode). A salt solution may be employed to supply ions for creating a conductive path between the electrodes. Any salt, such as potassium hydroxide, for example, may be used to form the salt solution. As a result, the water will be broken down into hydrogen and oxygen, each of which will form on separate positive and negative electrodes, respectively. Ultimately the hydrogen and oxygen will rise through the liquid for collection at the housing outlet. Any other materials will also be separated, each of which may be removed according to any known methods.

In particular embodiments, anodes and cathodes are arranged on opposing sides of the coils within closed-loop passage, between a coil and a magnet. Anodes and cathodes may comprise any known material, such as, for example, copper and zinc, respectively. In other embodiments, two or more separate housings may be employed, whereby each housing includes an independent closed-loop passage and either anodes or cathodes, whereby the anodes and cathodes are in fluid communication via a bridge facilitating the flow of electrons between the electrodes. By employing separate housings, each housing generates either hydrogen or oxygen gas, which may allow for a more simplified collecting of each gas at each housing outlet and also prevent the mixing the gases in a single housing. The gas collected may be pumped to a corresponding holding tank, such as by way of a pump or compressor. In such embodiments, the pair of housings may be arranged back-to-back. Electrolysis may also be used to break down the liquid into its constituents to ultimately filter any desired materials from the liquid or fluid being injected into housing.

With reference to FIGS. 3-18, particular embodiments of system 10 are shown. In such embodiments, a rotor-vessel, including magnetically conductive materials, translates about a closed-loop passage while magnets generating the magnetic field remains fixed. In forming a rotor-cup, it is understood that the iron core may simply form a portion of the rotor-vessel. It is understood, in other embodiments of the present invention, the iron core may remain fixed while magnets translate relative the iron core in any self-powered, closed-loop passage buoyancy-driven power generation device.

Figure 3:
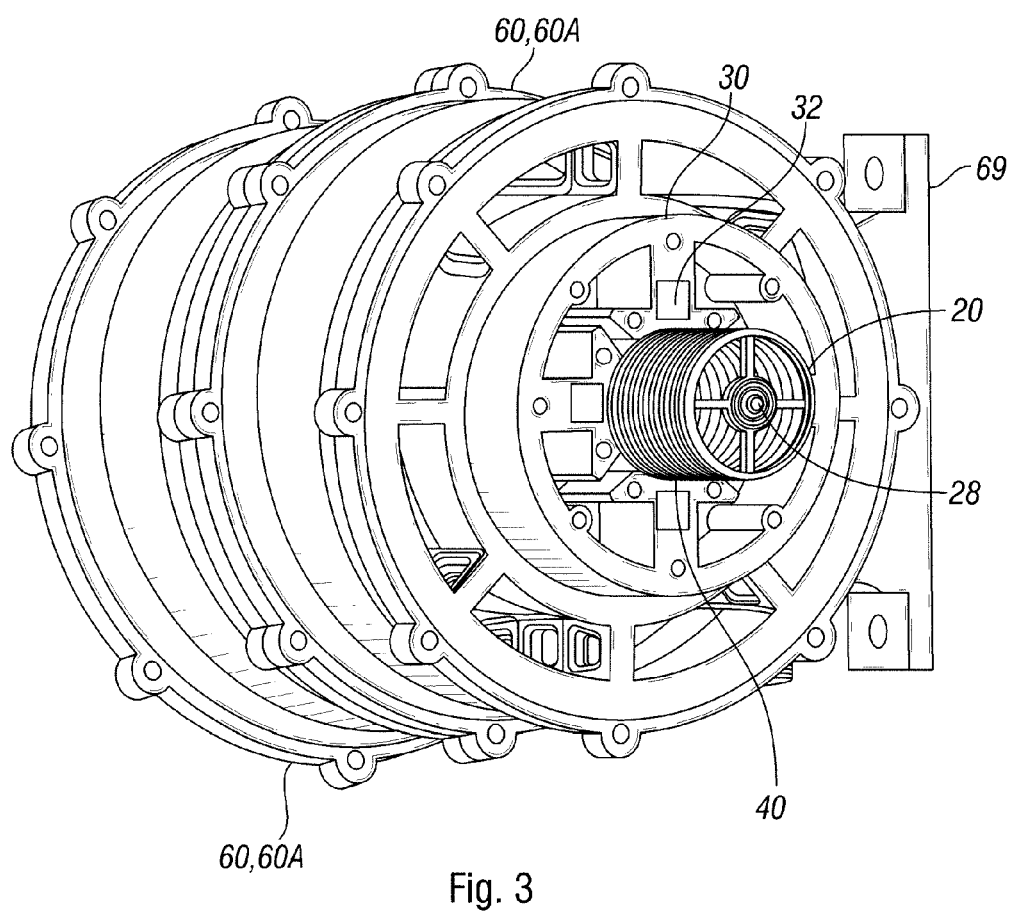
FIG. 3 is a perspective view of a segment of the closed-loop system shown in FIG. 1.

With general reference to FIG. 3, a segment of the housing 60A shown in FIGS. 1 and 2 in accordance with a more specific embodiment. The housing segment 60A forms a partial length of the housing and the closed-loop passage formed therein. Shown in this figure is a rotor-vessel 20 arranged in a closed-loop passage 40 formed within a stator 30. It is noted that a bottom side of the rotor-vessel is shown, the bottom side 25 including one or more apertures 26 for receiving fluid during operation of the buoyancy-driven energy generation system. Optional housing mounting brackets 69 are also shown for mounting the housing to any desired structure, such as a backing structure 61 shown in FIG. 1.

Figure 4:
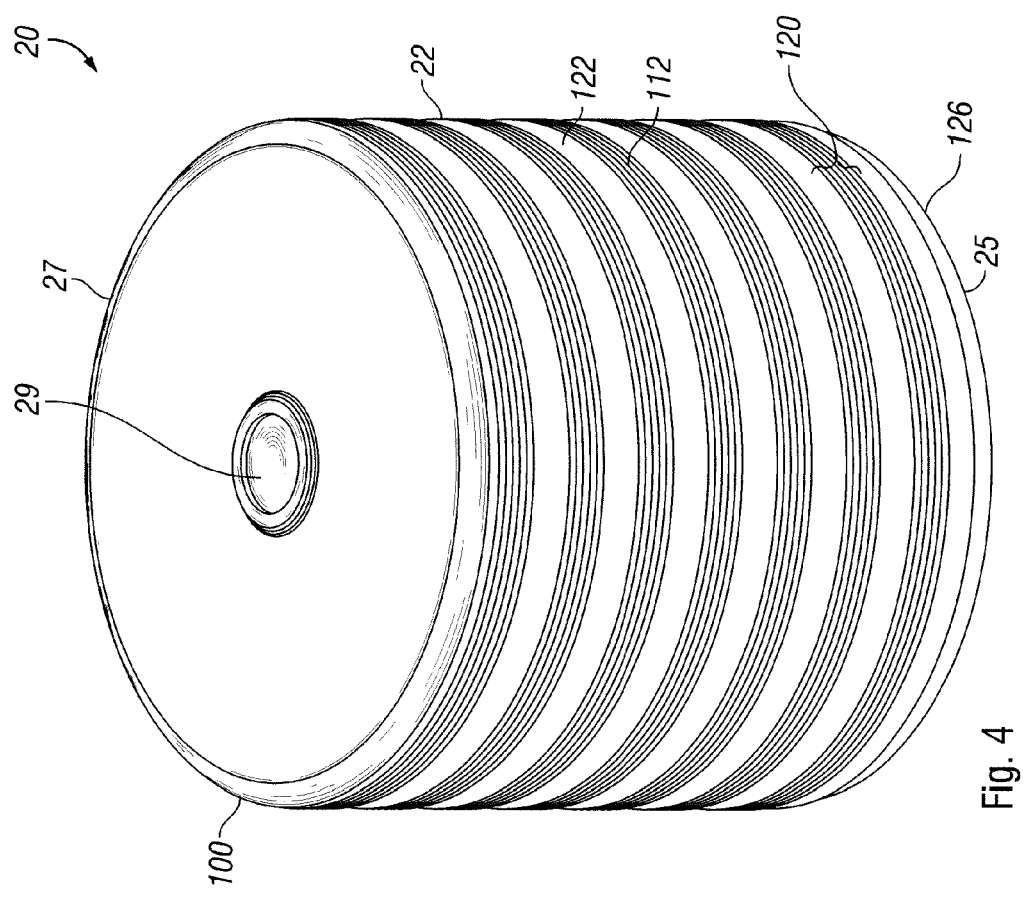
FIG. 4 is a top perspective view of a rotor-vessel shown in FIG. 3, in accordance with a particular embodiment of the invention.
Figure 5:
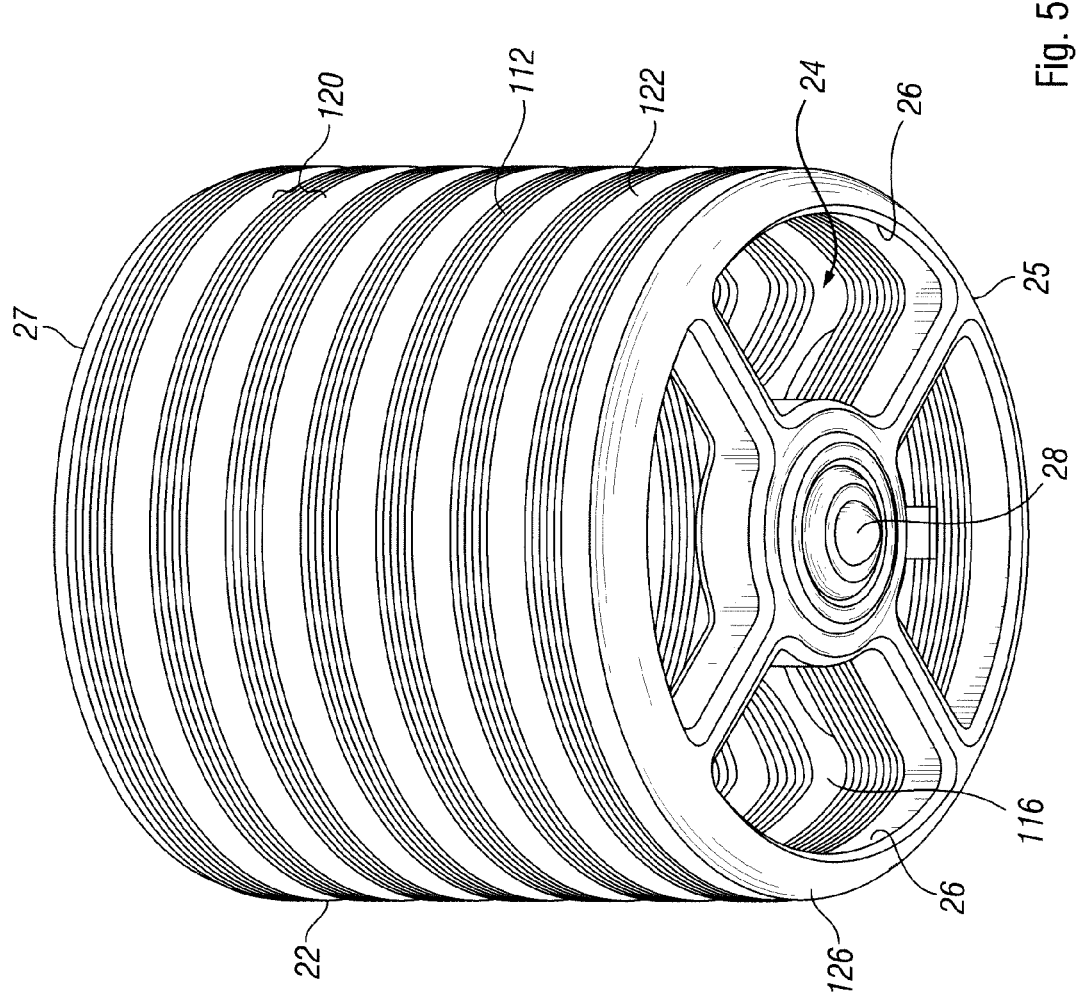
FIG. 5 is a bottom perspective view of a rotor-vessel shown in FIG. 4, in accordance with a particular embodiment of the invention.

In FIGS. 4-12, an exemplary embodiment of a rotor-vessel 20 is shown. The following describes the exemplary embodiment in association with the buoyancy-driven power generating system generally described above and in association with FIGS. 1 and 2. In FIGS. 4 and 5, a rotor-vessel 20 is shown to have a top side (or top end) 27 arranged opposite a vessel bottom side 25 relative a height of the vessel. The vessel 20, and in particular the vessel body 22, is formed of a plurality of plates 112 (also referred to as "rotor plates") formed at least partially of electrically insulating material and arranged in a stacked arrangement 120 of vessel plates. Magnetically conductive materials include without limitation iron and steel. The plates are laminated with a non-conductive coating and/or a coating to prevent corrosion of the plate due to immersion in any liquid, and minimized the flux leakage in the magnetic circuit. Plates may also be covered with a lubricating or low-friction, non-conductive coating to operate as a bearing material to assist in the translation of the vessel through the passage. It is understood that It is understood that the structure of the vessel (such as the plates) may be formed at least partially from a hardened material or more generally may be hardened by any known process or coating to improve the wear and durability of the vessel to increase the structural longevity of the vessel as it translates through the passage. For example, exemplary processes include use of, wire-arc, high velocity oxygen fuel (HVOF), plasma sprayed hardened materials, and heat treatment.

Figure 7:
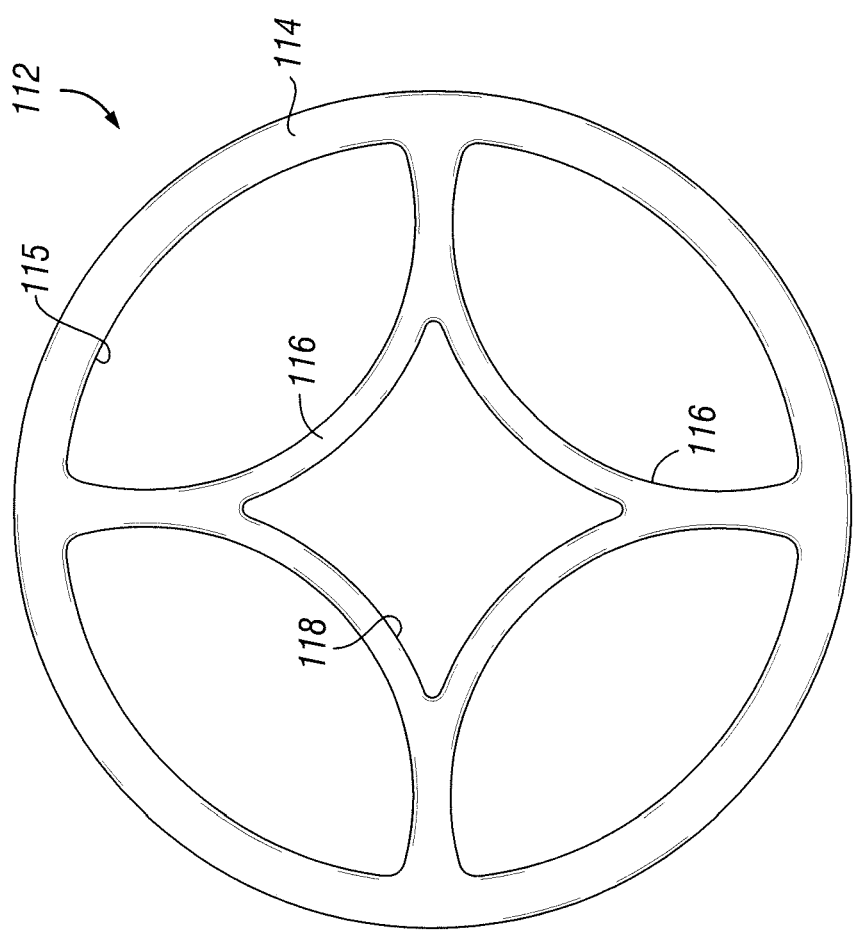
FIG. 7 is a top view of plate shown in FIG. 6.

With reference to FIG. 7, in particular embodiments, at least a portion of plates 112 includes one or more magnetic field flow members 114, 116 forming a structural magnetic field flow path extending between two magnets arranged within the surrounding structure defining the closed-loop passage. The magnetic field flow members assist in controlling the magnetic field by forming a desired pathway for the magnetic flow. In particular, flow members assist in concentrating and/or directing the magnetic field between magnets arranged in the surrounding structure. Accordingly, the flow members may extend along any desired path in any linear or non-linear (including curvilinear) direction. In the embodiment shown in FIG. 7, inner magnetic field flow members 116 extend from an outer magnetic field flow member 114 defining a perimeter of the plate, the inner flow members 116 extending into and across a portion of a central aperture 115, and ultimately, with reference to FIG. 5, when arranged to form the body 22 of a vessel 20, the inner flow members extend across a portion of the fluid-retention cavity 24 (see FIG. 5). The inner flow members also form an aperture 118 for arrangement along a first frame member 104 for assembling a stack of plates and any spacers (see FIG. 10).

Figure 6:
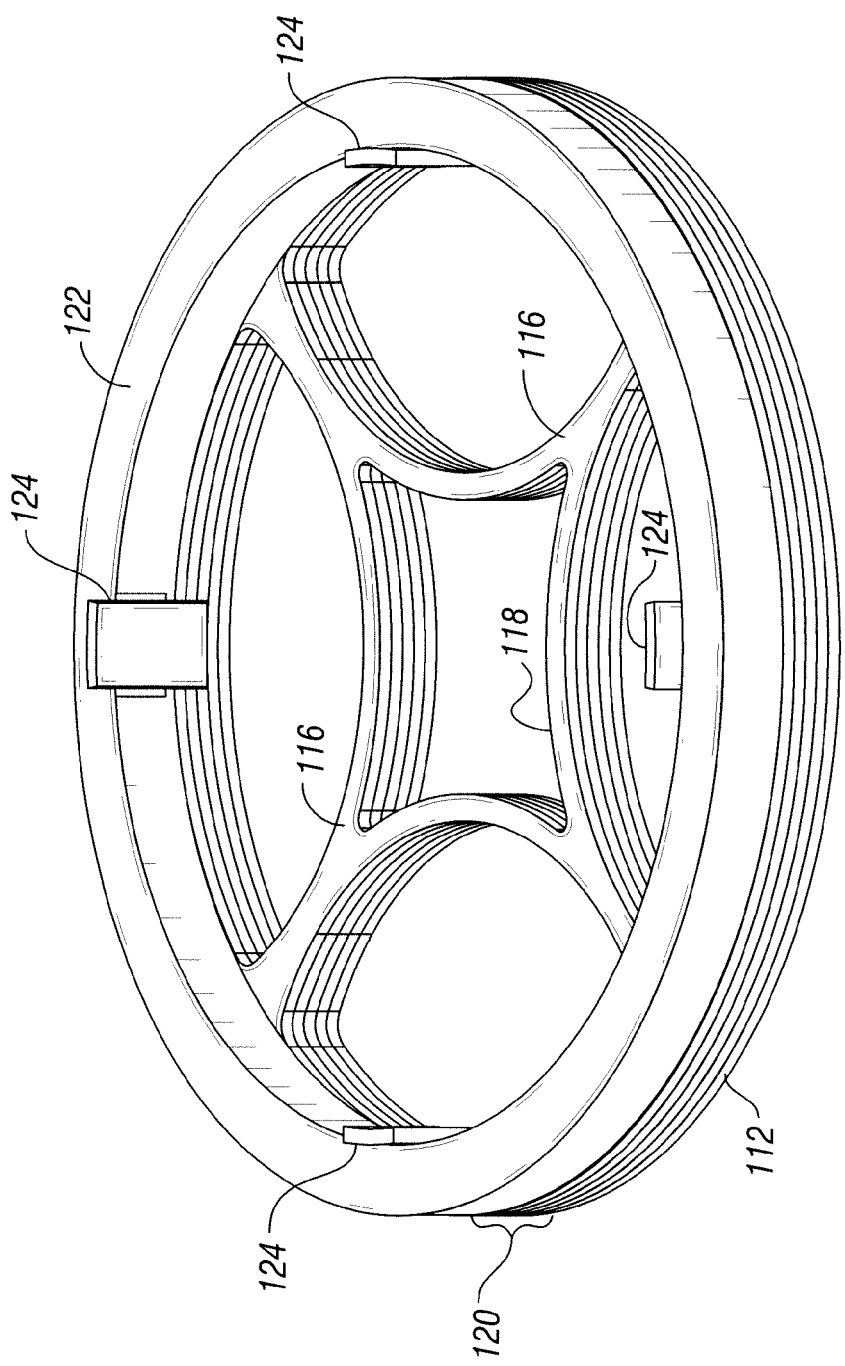
FIG. 6 is a top perspective view of a stack of plates with a spacer for forming a rotor-vessel of FIG. 4, in accordance with a particular embodiment of the invention.

Optionally, the stacked arrangement of vessel plates includes one or more spacers 122 formed of non-electric, non-magnetic conducting material (that is, an electrically and magnetically non-conducting material) and arranged within the stacked arrangement 120 separating one or more of the plurality of plates 112 of the stacked arrangement. Or, in other words, it can be said that a plurality of stacked arrangements 120 of vessel plates 112 are arranged to form vessel 20 and vessel body 22, where each of the plurality of stacked arrangements of plates are spaced apart by one or more spacers 122 formed of electrically insulating material. With reference to FIG. 6, for example, a single stacked arrangement 120 of plates is shown in association with a spacer 122. The spacer is formed of any known non-electric, non-magnetic conducting material, including without limitation any plastic (such as acrylonitrile butadiene styrene (ABS), for example) or elastomer, ceramics. Moreover, the spacer may be formed in any shape.

Spacers 122 may comprise any desired shape sufficient to form body 22 and fluid-retention cavity 24. In the embodiment shown, the spacer 122 includes a perimeter structure comprising an annular member (i.e., a ring) similar in shape and size to the perimeter structure of the plate 112 to provide a body 22 that is sufficiently sealed along the perimeter to maintain fluid within the fluid-retention cavity 24. In the embodiment shown, each spacer 122 includes tabs 124 comprising members protruding outwardly in a lengthwise direction of the vessel (or in a direction of a thickness of the plates) to generally secure or constrain, as well as aligning, each plate 112 and each stacked arrangement 120 of plates engaged by the spacer tabs. In the embodiment shown, the tabs extend outwardly from the annular member in an axial direction of the annular member.

It is understood that the plurality of plates with any spacers may be constrained and maintained in a stacked arrangement using any desired mechanism to form a body of the vessel. Any desired mechanisms includes, without limitation, pins, rivets, adhesive, welding, or any mechanism operating to clamp the stacked arrangement in a closed arrangement to form the vessel body and even the fluid-retention cavity of the vessel. In a further example, with reference to FIGS. 8-12, a vessel plate stack constraining frame to form the rotor-vessel shown in FIGS. 4 and 5 includes a first frame member 100 and a second frame member 126 configured to matingly engage to maintain a stacked arrangement of plates 112 and any desired spacers 122 to form a vessel body 22 containing a fluid-retention cavity 24. In the embodiment shown, first frame member comprises an elongate member 104 configured to receive and extend through an aperture extending through each of the one or more plates 112 and any spacers 122 as may be provided. In other variations, it is understood that first frame member may comprise a plurality of elongate members extending separate apertures arranged within the plates and any spacers.

To assist in constraining the plates and/or spacers along the elongate member, an end cap may arranged at a terminal end of the elongate member (or, in other words, the elongate member extends outwardly from an end cap), where any stack, or plate or spacer, first arranged along the elongate member engages the end cap as exemplarily shown in FIGS. 4 and 5. With reference to an exemplary embodiment shown in FIGS. 8-10, a cap 102 is shown arranged at a terminal end of elongate member 104. The cap 102 arranged along the cap 102 is arranged along the top side 27, which is the leading side of the cap, the cap may be designed so to reduce drag and other forces for improving each rotor-vessel's ability to translate more efficiently through liquid 70.

In particular embodiments, to improve the constraining capability of the elongate member 104 to constraint plates 112 there along, the elongate member has a periphery 105 (see FIG. 9) that is closely sized and shaped to the periphery of a corresponding aperture 118 of a plate 112 (see FIG. 7) for arrangement along the elongate member. It is understood that the shape of each periphery may be selected to constrain (that is, prevent) rotation around the elongate member. For example, with reference to FIGS. 7 and 9, each corresponding periphery of the aperture 118 and of the elongate member 104 (periphery is identified as 105) comprise a non-circular shape, such as without limitation a superellipse star, where the sides of the star form concave sides comprising arcs of parabolas. In the embodiment shown, the star is a four-sided star (although the star may have any number of sides, that is, three or more sides).

Figure 8:
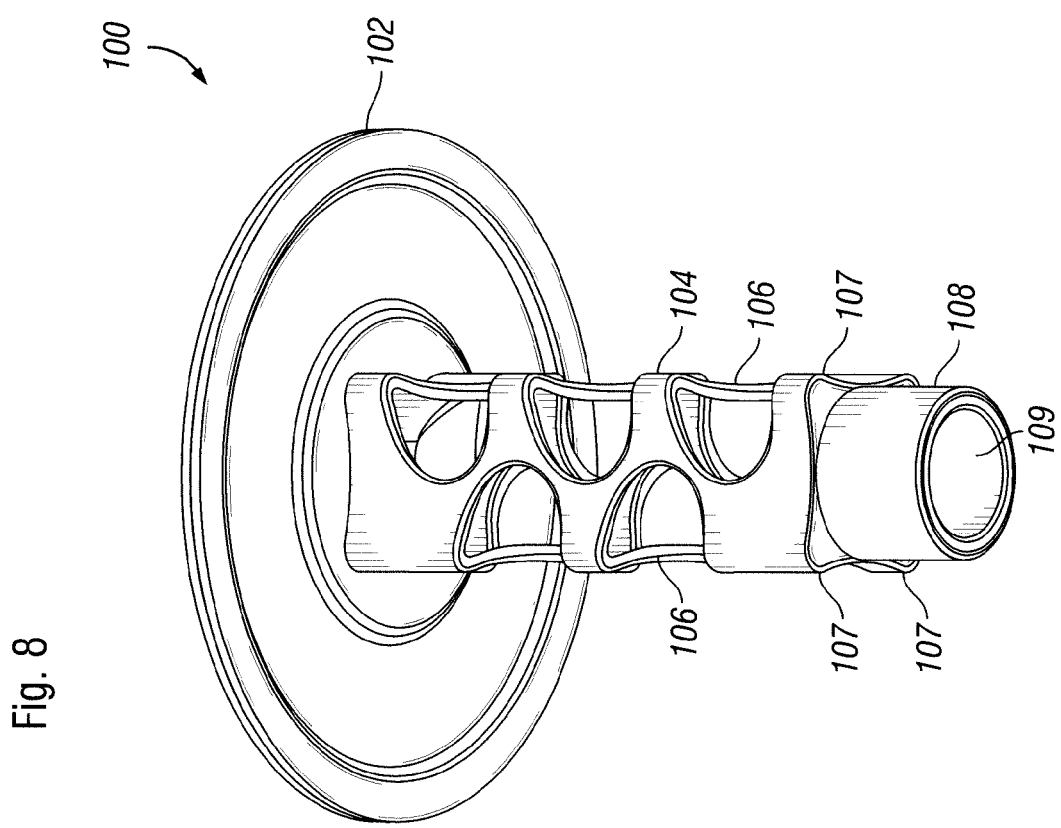
FIG. 8 is a bottom perspective view of a first frame member for constraining a stack of plates for forming a rotor-vessel of FIG. 4, in accordance with a particular embodiment of the invention.
Figure 9:
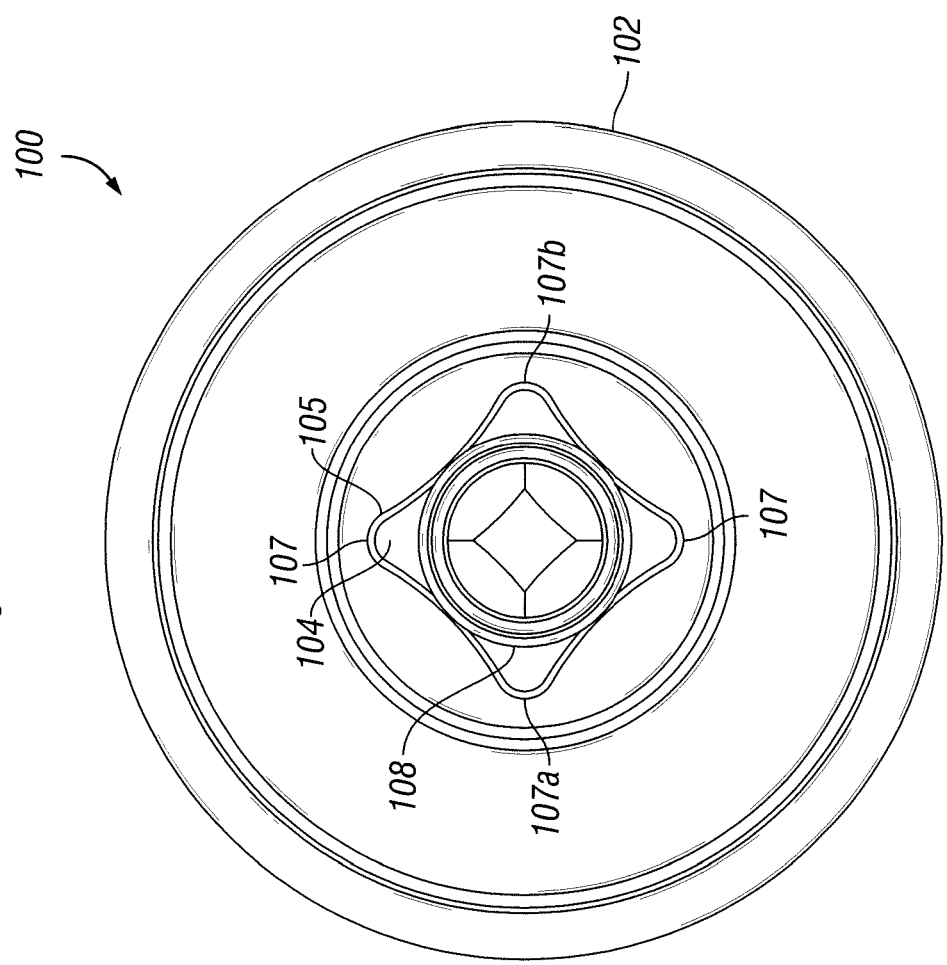
FIG. 9 is a bottom view of the first frame member of FIG. 8.
Figure 10:
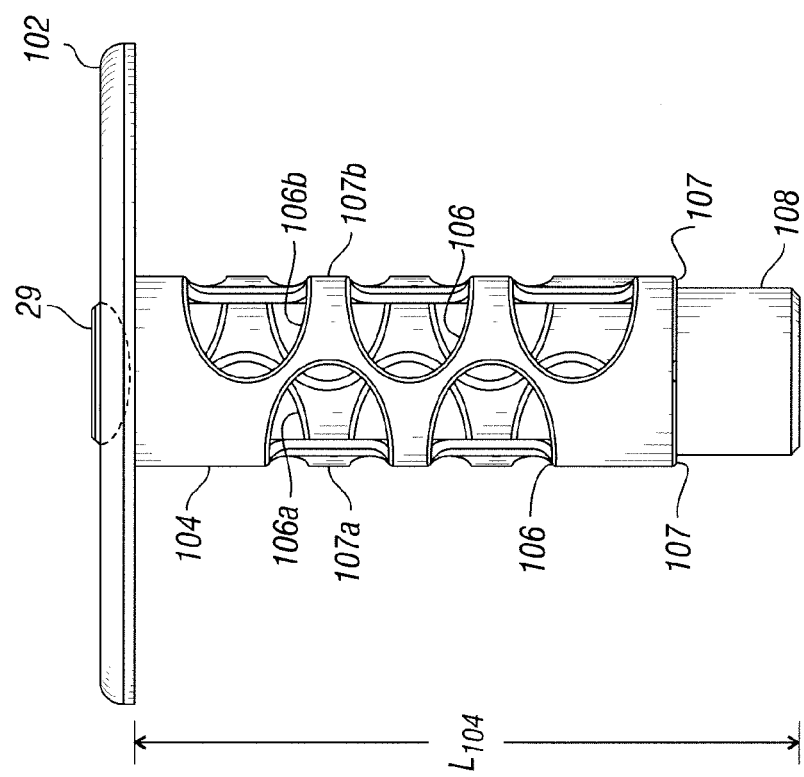
FIG. 10 is a side view of the first frame member of FIG. 8.
Figure 11:
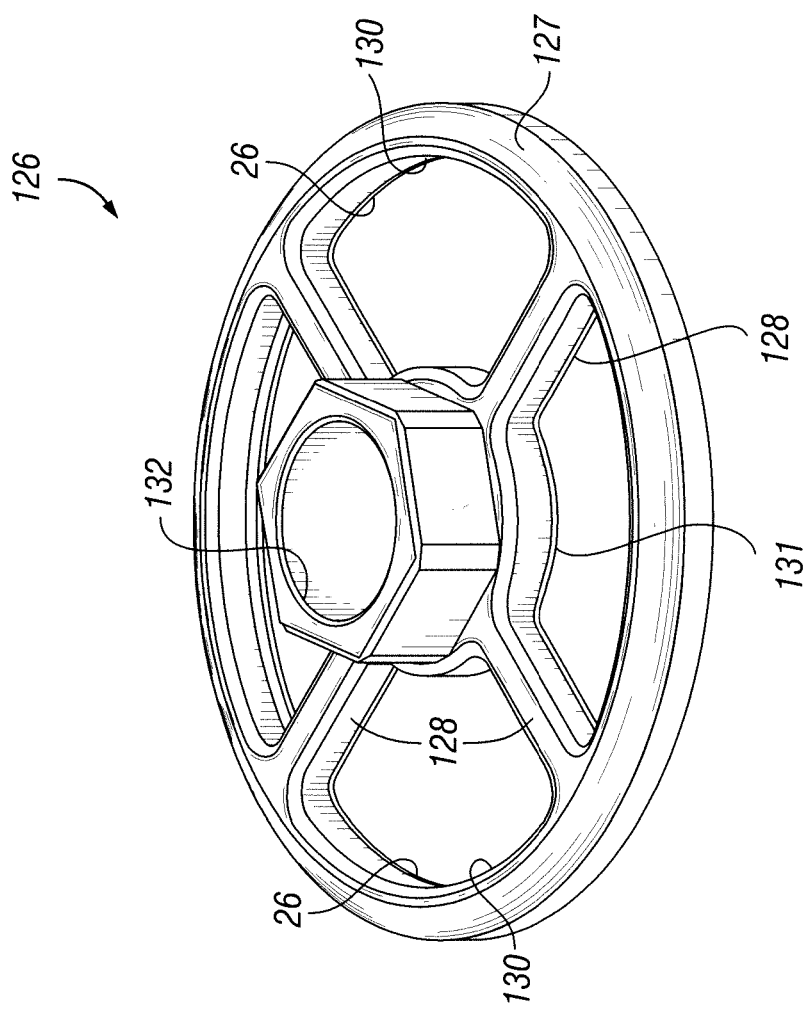
FIG. 11 is a top perspective view of a second frame member for constraining a stack of plates with the first frame member for forming a rotor-vessel of FIG. 4, in accordance with a particular embodiment of the invention.
Figure 12:
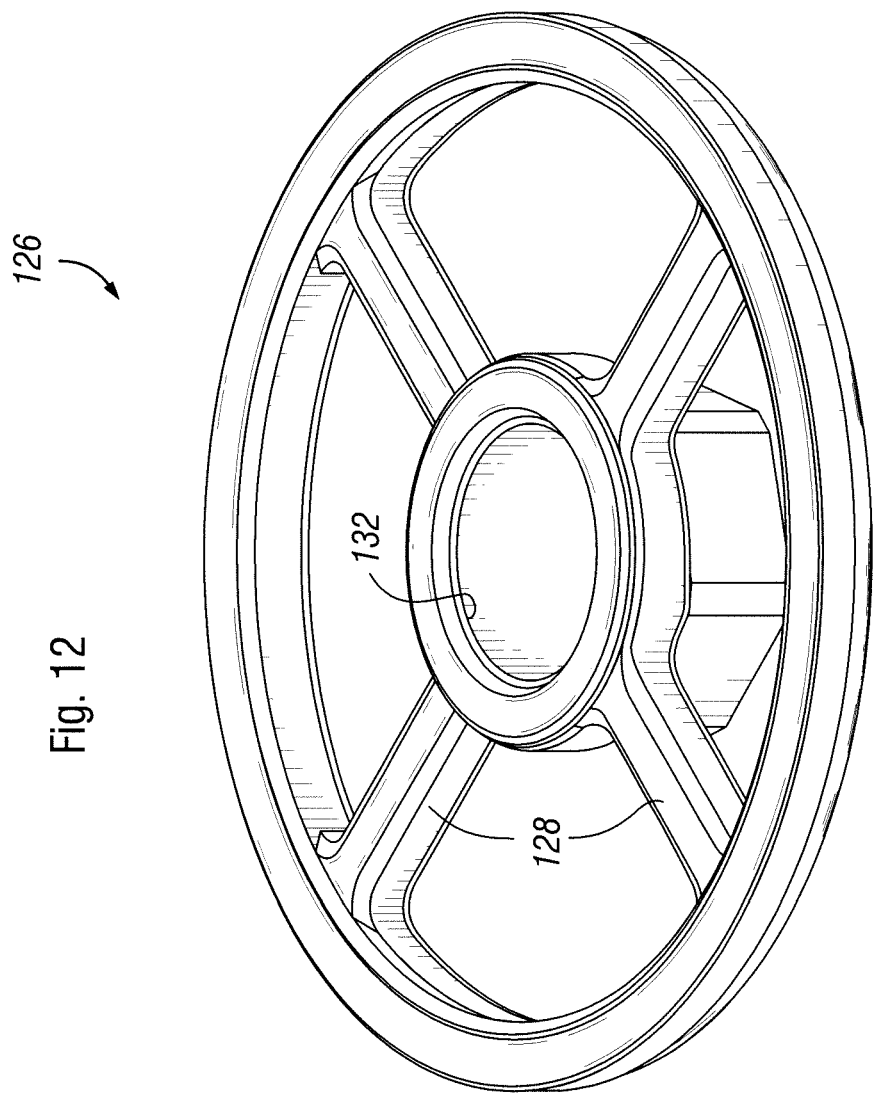
FIG. 12 is a bottom perspective view of the second frame member of FIG. 11.

In the embodiment shown in FIGS. 8-10, the elongate member 104 of first frame member 100 includes a plurality of apertures 106 arranged in spaced relation along a length of the elongate member. In particular, the apertures 106 are arranged along each corner of the periphery 105 of the elongate member, each corner 107 being arranged at the intersection of each side of the periphery of the elongate member. More specifically, in the present embodiment which includes four (4) corners, each pair of opposing corners include the same arrangement of apertures 106 such that a pair of opposing apertures 106a, 106b are formed, where a first aperture 106a is arranged along a first corner 107a and a second aperture 106b is arranged along a second corner 107b, the first and second corners being oppositely arranged along the periphery 105 and arranged at the same lengthwise location along the length $L_{104}$ of the elongate member. While the apertures 106 of elongate member 104 allow fluid to flow through the elongate member within the fluid-retention cavity 24, the oppositely pairs of apertures 106a, 106b allow the plates 112 and any spacers 122 to be rotated about a longitudinal axis of the elongate member so to lock any such plate and spacer into a position longitudinal position along the length of the elongate member (whereby any such plate or spacer is constrained from translating along the length of the elongate member).

First frame member, in conjunction with second frame member 126, which operates as a cap operably fixed to the first frame member to constrain an arrangement of plates 112 with any spacers 122 in a stacked relation to form at least a portion of the vessel body 22. In particular, for example, operable fixation may be achieved by operably attaching a free end 108 of the elongate member 104 within a corresponding cavity 132 configured to receive the free end, the cavity arranged along a first side of the second frame member. Securement between the pair of male-female members may be obtained by use of any known mechanism, such as without limitation by use of a threaded attachment, adhesive, welding, or by use of any fastener, clip, or pin. Of course, other known mechanisms for operably attaching the first frame to the second frame may be employed in lieu of free end 108 and/or cavity 132. It is understood that because the second frame member is arranged along an open side of the rotor-vessel, second frame member includes one or more apertures 130, which operate as apertures 26 of the rotor-vessel 20. To provide inner structure 131 for forming cavity 132 inward of the outer perimeter of the second frame member 126, connectors 128 extend from an outer perimeter member 127 to inner structure 131. It is understood that one or more connectors may be employed to form one or more apertures 130.

With specific reference to FIG. 5, a bottom side 25 of the vessel is shown to include one or more apertures 26 providing fluid access to the inner cavity referred to as the fluid-retention cavity 24. In the embodiment shown, the vessel optionally includes a protruding alignment member 28 configured to be received in a mating recess 29 (shown in FIG. 4) arranged along a top side of a second vessel 20 arranged below the subject vessel for the purposes of maintaining the lateral or radial alignment of adjacent vessels within the closed-loop passage. It is understood that any known alignment mechanism may be employed to achieve such purpose. For example, in the embodiment shown, the protruding member 28 comprises a ball sprung by a spring (not shown) arranged between the ball and the vessel to provide shock-absorbing properties when adjacent vessels collide during system operation. It can be said that member 28 and recess 29 form a male-female association. Optionally, it can also be said that either member may be arranged along the top side of the vessel while the other is arranged along the bottom side of the vessel. In particular embodiments, with reference to FIGS. 5, 11, and 12, alignment member 28 is arranged within an aperture 132 within the second frame member 126 (and also, in certain instances, concurrently within a cavity 109 arranged at the terminal end 108 of the first frame member 100). With reference to FIGS. 4 and 10, the mating recess 29 is arranged within a cap 102 of the first frame member 100. Of course, in the alternative, other alignment structure may be employed in lieu of member 28 and recess 29.

In alternative embodiments, first frame member may comprise a member having a cavity for receiving the plates and any spacers. For example, such a member may comprise, without limitation, a tube or cylinder having at least one open end where the other end is either open or closed. Any known mechanism may be employed to maintain the plates and spacers within the cavity, such as by using any desired mechanism, such as by employing one or more caps or fasteners, etc.

Figure 20:
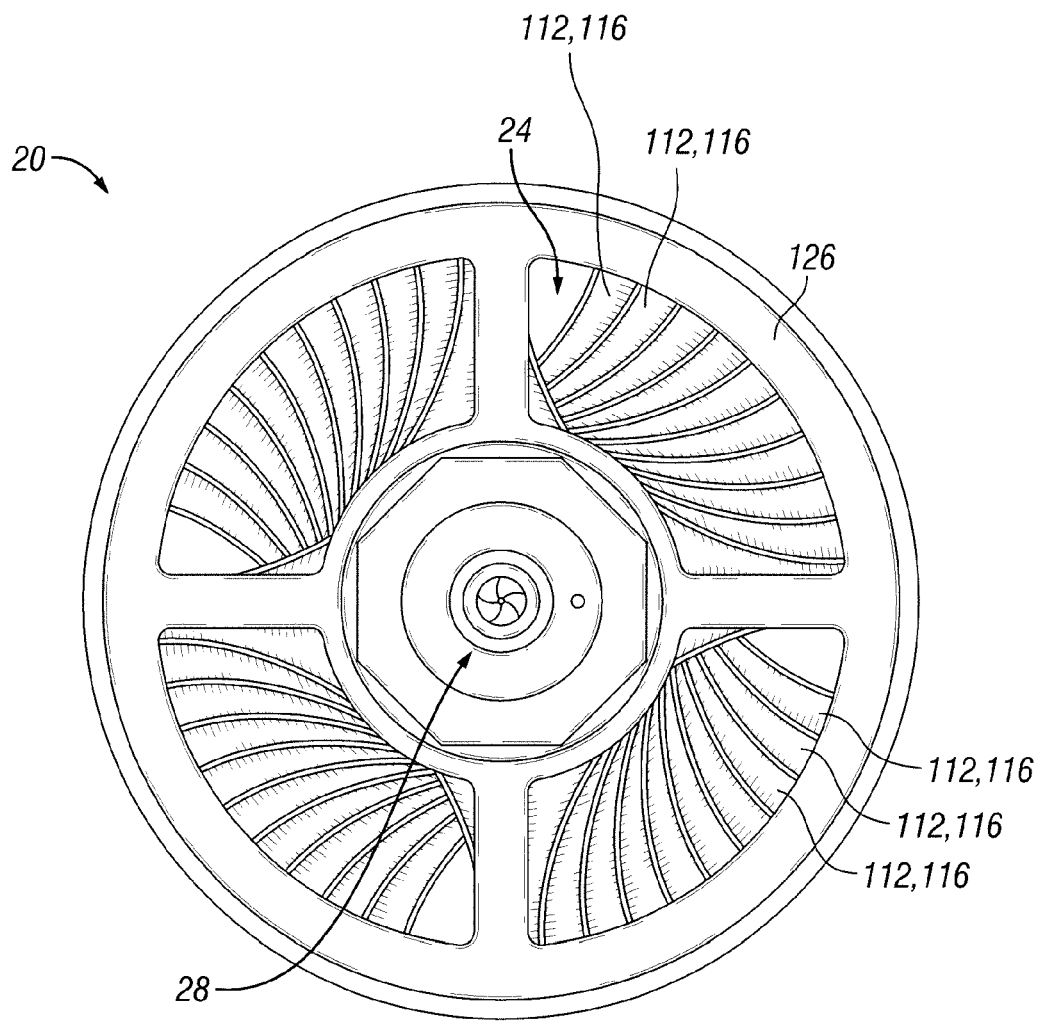
FIG. 20 is an end view of the rotor-vessel showing axially-staggered plates and spacers used to form the vessel body, in accordance with an embodiment of the invention.

In particular embodiments, with reference to FIG. 20, rotor-vessels 20 spin or rotate about a longitudinal axis of the vessel extending in a lengthwise direction of the vessel between the top side 27 and the bottom side 25 of the vessel (shown in FIGS. 4 and 5). This may be achieved by arranging the plates 112 in a rotated-stacked arrangement by rotating each adjacent plate in the stack about a longitudinal axis of the vessel, whereby the inner magnetic field flow members 116 of each adjacent plate is biased or misaligned relative any inner magnetic field flow members of an adjacent plate. For example, each plate 112 within a stack 120 may be step-wise biased by a particular rotational increment in a particular direction of rotation as the plates progress through the stack to provide a spiraled arrangement of inner magnetic field flow members within a vessel 20. This can cause the each vessel 20 to rotate due to the effects of the magnetic field passing through magnetic flow members 116 of each rotationally staggered plate layer as each vessel 20 passes through a magnetic field generated by magnets 32. Rotation or spinning of vessel 20 rotation may allow the vessel to be larger in mass, which increases its kinetic energy potential as it translates throughout the system.

Figure 13:
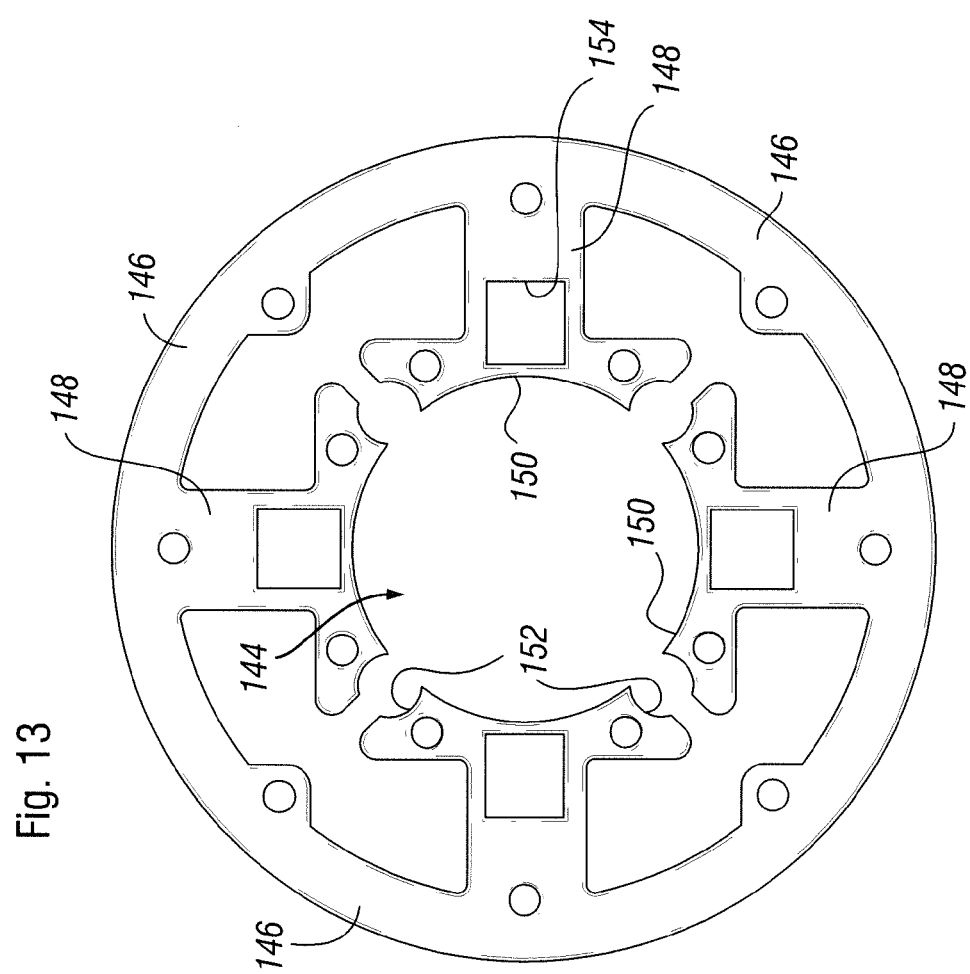
FIG. 13 is a top view of a plate for forming a grouping of stacked plates to form a stator defining and surrounding a closed-loop passage of the system, in accordance with a particular embodiment of the invention.
Figure 14:
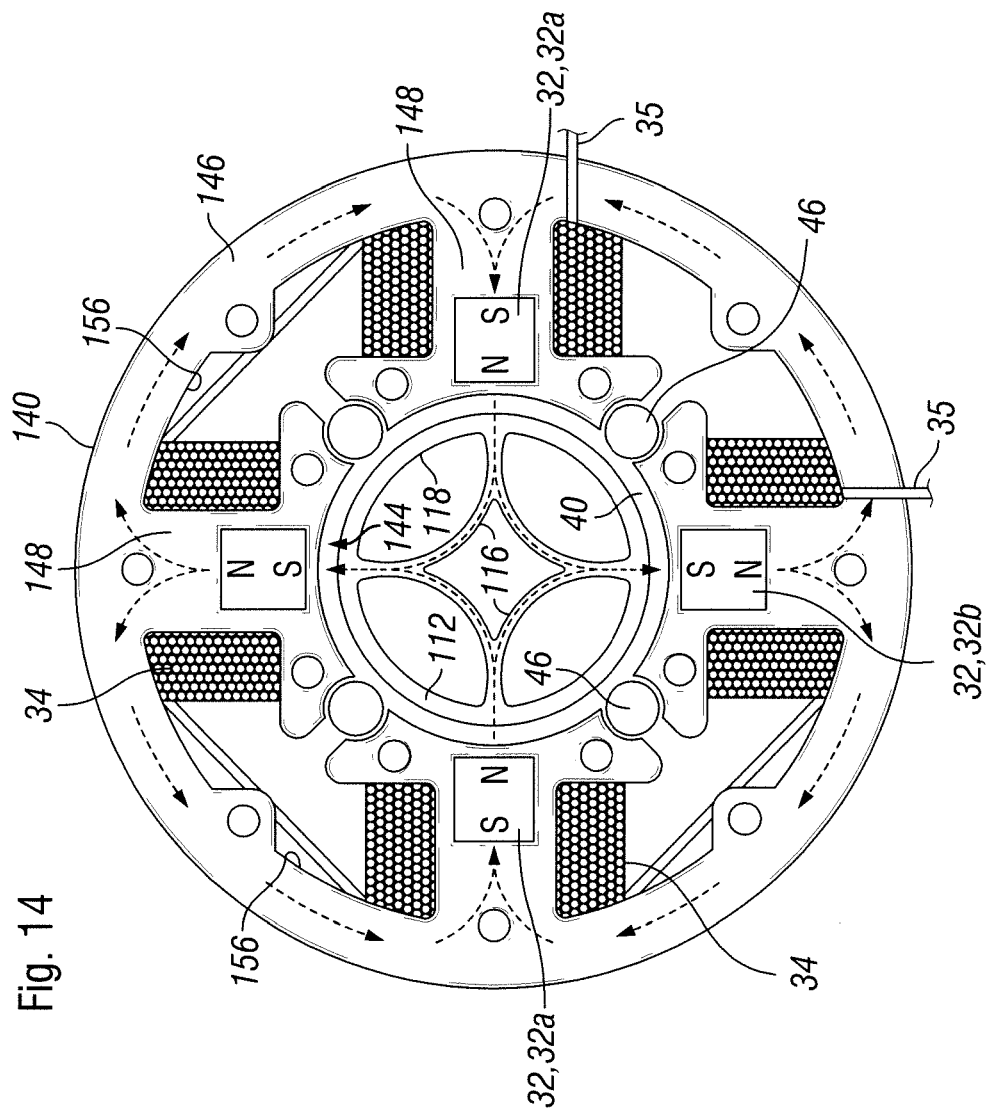
FIG. 14 is a top view of the stator plate of FIG. 13 shown in association with a working arrangement of components, in accordance with a particular embodiment of the invention. Magnetic flux flow is represented by the arrows arranged along the stator plate and the rotor plate.

As discussed, each rotor-vessel operates within a closed-loop passage defined by surround structure, which includes one or more stators arranged adjacent the passage. With reference to FIGS. 13 and 14, closed-loop passage 40 is formed by surrounding structure comprising a stator and including an arrangement of stator plates 140 each having a central aperture 144. Passage 40 is specifically formed by arranging stator plates 140 in a stacked arrangement in a closed-loop path, such as within housing 60, whereby the central apertures 144 of adjacent plates are aligned, such as concentrically for example, to form a tubular-shaped, closed-loop passage 40. Specifically, with reference to FIG. 2, the stator plates 140 are grouped into stacks 142. In the embodiment shown, the groups of stacks 142 are spaced apart within housing 60 along the housing length or along the length of the closed-loop passage 40.

While the plate may have any desired configuration to define a central aperture, in the embodiment shown in FIGS. 13 and 14, arm members 148 extend radially inward from an outer member 146 of the plate to an inner edge 150, which at least partially defines central aperture 144. The outer member 146 forms a perimeter of the plate. Outer member 146, and therefore the perimeter, may form any cross-sectional shape, such as a circle (shown) or square, for example.

In the embodiments shown, the passage 40 as formed by the plurality of stator plates 140 is in fluid communication with the coils, etc. surrounding passage 40. However, in alternative embodiments, a closed structure may be arranged within an aperture 144 and extend longitudinally through a plurality of apertures 144 associated with a plurality of stator plates 140 to form a closed-loop passage 40, where rotor-vessels translate through a liquid contained therein, the liquid being isolated from the plates, coils, and magnets arranged outside such housing or secondary housing arranged within the apertures.

The one or more arms of each plate are configured to be wound at least partially by a wire coil. In is understood that wire coils may be wound about a single arm or a plurality of arms, where the plurality of arms comprise a group of similarly aligned arms associated with a group of stacked plates. In the embodiment shown in FIG. 2, a plurality of stator plates 140 are arranged in a stacked grouping 142, such that a wire coil is wound about a stacked arrangement of arms of the grouping of plates. It is understood that each plate may comprise any quantity of arms. For example, in the embodiment shown in FIGS. 13 and 14, a plate comprises four (4) arms 148 spaced ninety degrees (90°) about central aperture 144. Generally, each arm 148 is arranged to position a corresponding coil 34 near aperture 144.

Figure 14A:
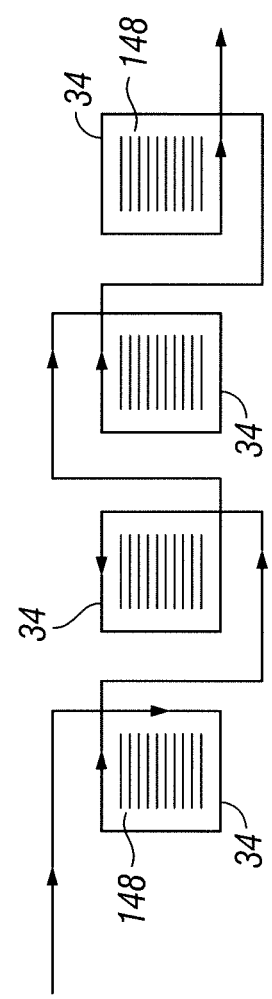
FIG. 14A is a schematic view showing the winding direction of each wire coil wound about a plurality of stator plate arms, in accordance with a particular embodiment of the invention. Magnetic flux flow is represented by the arrows arranged along the wire coil.
Figure 15:
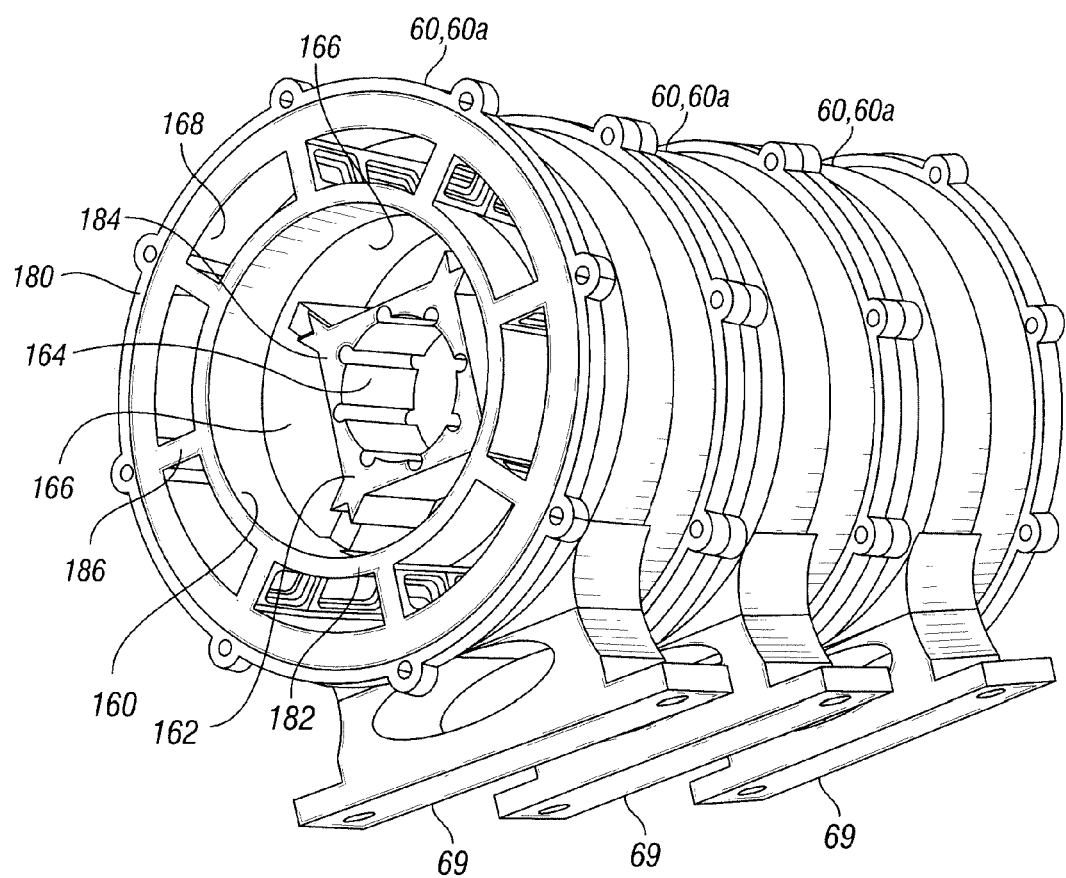
FIG. 15 is a front perspective view of a housing segment of FIG. 3, in accordance with a particular embodiment of the invention.
Figure 16:
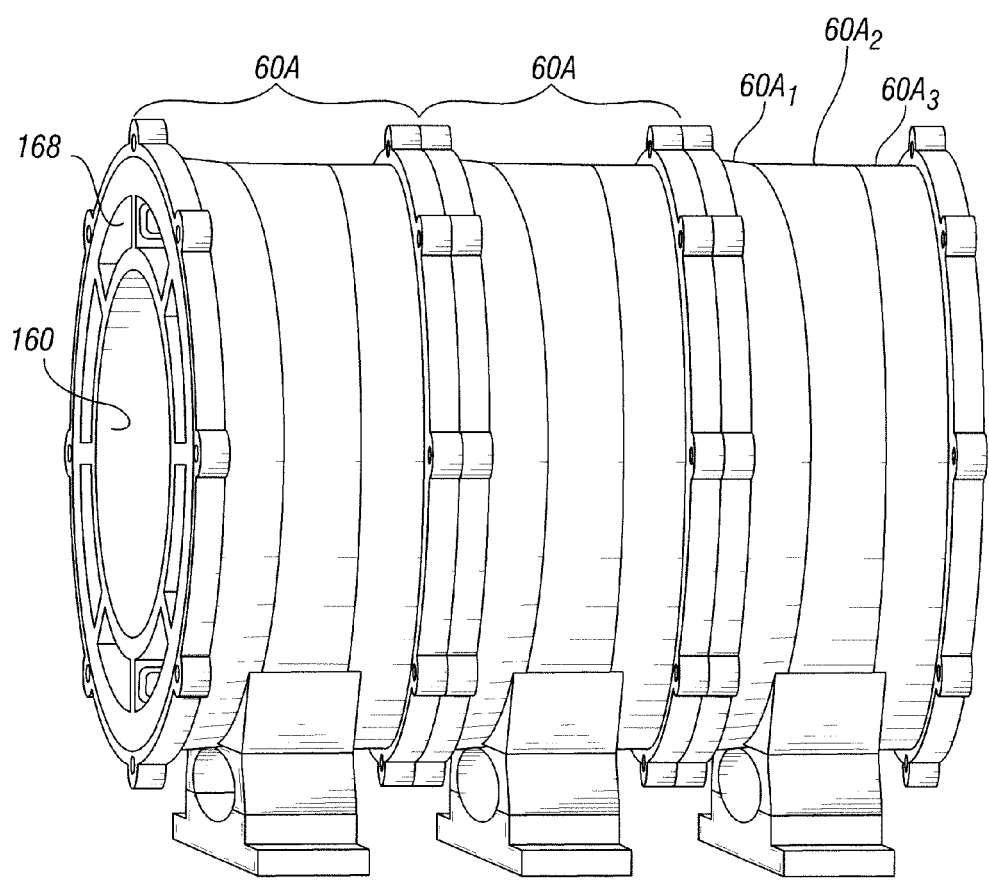
FIG. 16 is a side view of the housing segment of FIG. 15.
Figure 17:
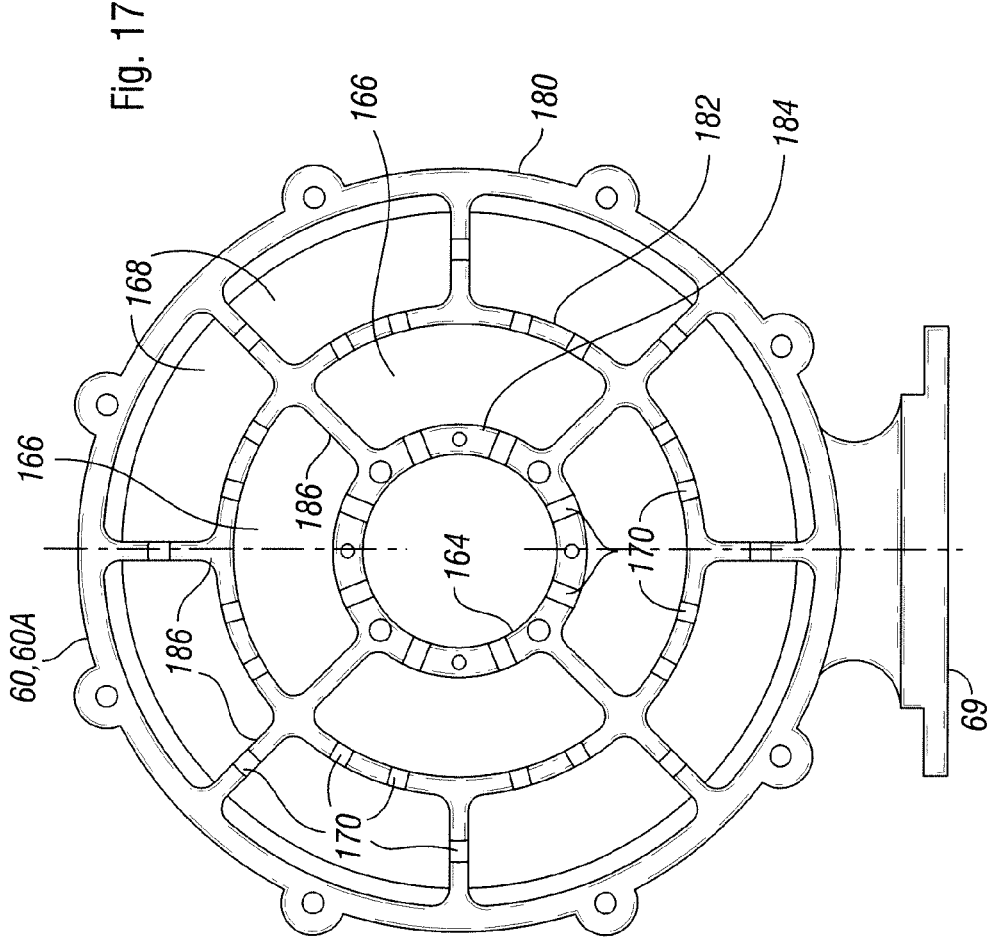
FIG. 17 is a front view of the housing segment of FIG. 15.
Figure 18:
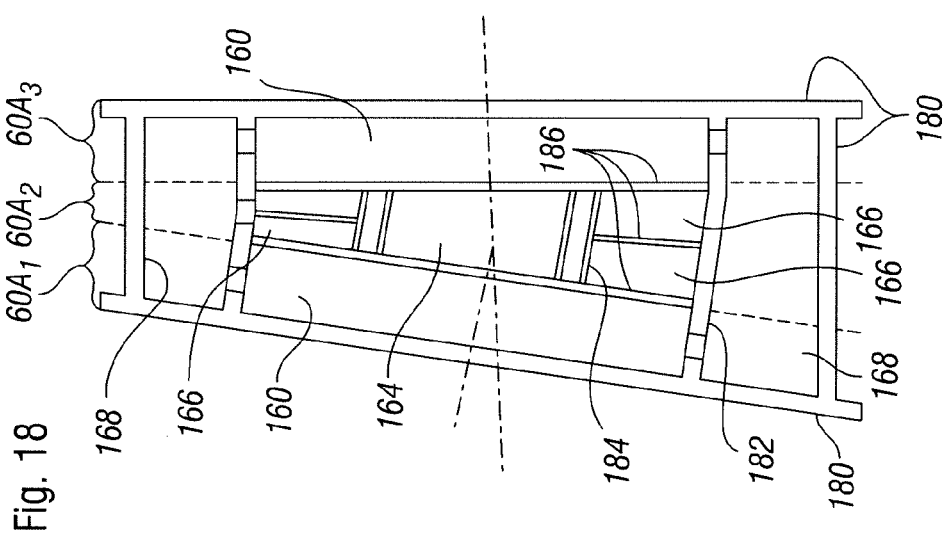
FIG. 18 is a cross sectional view of the housing segment of FIG. 17.

Wire coils are wound in cooperation with the magnetic fields in any known manner to generate or maintain a current flow, such as where the wires of any coil are wound in a direction perpendicular to the flow of magnetic flux. In a particular embodiments, with reference to FIG. 14A, coils 34 are arranged in an alternating pattern, where a first coil 34 is wound in a clockwise direction and a second, adjacent coil 34 is wrapped in a counterclockwise direction. This pattern may be repeated as often as desired. Because four (4) coils 34 are employed in FIG. 14, the diagram of FIG. 14A represents four (4) coils 34 employing the alternating winding pattern around one or more arms 148. The coils 34 are wound using a continuous electrically conductive wire, such that all coils are in electric communication.

One or more magnets are arranged along the closed-loop passage to create a magnetic field. In particular embodiments, a plurality of magnets are arranged in a stacked arrangement. While other configurations may be employed, in particular embodiments shown in FIG. 14, one or more magnets 32 are arranged along each plate 140. In particular, stator plate 140 includes an aperture 154 for receiving at least one magnet 32, which may be associated with a stacked arrangement of magnets. Each aperture 154, and therefore one or more magnets 32, is positioned between the one or more coils 34 and the central aperture 144 (or passage 40) to create a magnetic field for generating a current in coils 34 as each rotor-vessel 20 passes within passage 40 and through the magnetic field created by the magnets.

Magnets 32 may comprise any magnet. In particular embodiments, each magnet 32 shown is a permanent magnet, which is made from a material that is magnetized and creates its own persistent magnetic field. Generally, each magnet is formed of any ferromagnetic or ferrimagnetic material, such as iron, nickel, cobalt, some alloys of rare earth metals, and lodestone, for example. Ferromagnetic materials can be divided into magnetically "soft" materials like annealed iron which can be magnetized but don't tend to stay magnetized, and magnetically "hard" materials, which do. Permanent magnets are made from "hard" ferromagnetic materials which are subjected to special processing in a powerful magnetic field during manufacture, to align their internal microcrystalline structure, making them very hard to demagnetize. In particular embodiments, the magnets are formed of: alnico (aluminum, nickel, and cobalt); ferrite; samarium cobalt; ceramic; loadstone; or neodymium, iron, and boron (which is commonly referred to as a neodymium magnet, e.g., $Nd_2Fe_{14}B$). In other embodiments, each magnet may be an electromagnet made from a coil of wire which acts as a magnet only when an electric current passes through the coil. The electromagnet may be wrapped around a core of ferromagnetic material, such as steel, for example, which enhances the magnetic field produced by the coil. Further, it is understood that the rotor-vessel body, in whole or in part may form or complete the magnetic circuit.

With reference to the example in FIG. 2, a plurality of magnets 32 are arranged in a stacked configuration to extend through a thickness of the stator plate 140 and through a thickness of a stacked group 142 of plates. It can also be said that the plurality of magnets is arranged along a length of the closed-loop passage 40. To create a desired magnetic field, magnets 32 may be arranged as desired to achieve such purpose. For example, with reference to FIG. 14, four (4) magnets (each associated with a stacked arrangement of magnets) are arranged about aperture 144 in an alternating pole arrangement, where the north pole N of a first magnet 32a is directed radially inward toward the aperture 144 and a second adjacent magnet 32b in the arrangement is arranged to direct its south pole S radially inward. This pattern may be repeated as desired. According to this arrangement, with continued reference to FIG. 14, the magnetic field (the flow of the field is identified by arrows in FIG. 14 along members 146, 148) is directed inwardly into the aperture 144 (which may extend through a passing rotor-vessel 20 and a plate 112 of the vessel) from an inwardly facing north pole N and then back into the plate through an inwardly facing south pole S, where the magnetic field travels from a north pole N though a corresponding arm 148, through an outer member 198, and then through a second arm 148 towards a south pole S of a neighboring magnet 32. Thereafter, the magnetic field extends from a corresponding south pole N of the magnet back into the central aperture 144 and through any vessel 20 passing there through until, reaching a south pole S of the neighboring magnet 32. While four (4) magnets are shown, other variations of stator plates 140 and arrangements of any quantity or geometric shape of magnets may be employed to practice this invention. Stator plates 140 with coils 34 and magnets 32 are referred to as stators, while vessels 20 are referred to as rotors.

To facilitate flow of magnetic flux through a stator plate, each plate is at least partially formed of a magnetically conductive material. Plates may also be laminated with a non-electric and non-magnetic conductive coating and/or a coating to prevent corrosion of the plate due to immersion in any liquid. Plates may also be covered with a lubricating or low-friction (which may or may not also be the non-conductive coating) to operate as a bearing material for rotor-vessels. Such material includes wire-arc, high velocity oxygen fuel (HVOF), plasma sprayed hardened material. Plates may also be grouped to form a group of plates about which a coil may be wound.

With reference to the particular embodiments in FIGS. 13 and 14, each stator plate 140 includes one or more bearing void location 152 comprising a void configured to receive a bearing 46, the bearing facilitating translation of vessel 20 through passage 40. It is understood bearing 46 may comprise any bearing mechanism capable of assisting in the translation of vessel. Bearing 46 may comprise any bearing contemplated or discussed above, or otherwise herein. It is understood that any bearing may be contained within a bearing housing, such that the bearing void location 152 is configured to retain the housing therein. It is also understood that the configuration of the bearing may be adjustable so to adjust the distance from which bearing extends within aperture 144. In certain embodiments, the bearing is a linear bearing or an arrangement of one or more ball bearings, which may be lubricated, such as by use of a low friction coating formed on said bearing or by employing a paste or other known lubricating composition, to facilitate proper rotation. A spring may also be arranged within housing to allow said ball to deflect radially relative to aperture 144 for the purpose of absorbing any shock within system 10 or otherwise adjusting to accommodate translation of any rotor-vessel within passage 40. Additionally, or alternatively, other bearings may be arranged within a coupling or spacer separating stacked groupings 142 of plates 140, such as within the housing 60.

While the housing may comprise any desired design configured to achieve the purposes herein. In particular instances, the housing is partitioned into segments that may be assembled to form a larger length of the housing and ultimately a length of the closed-loop passage. Each segment may comprise one or more subsections assembled to form a length of the housing segment. In an exemplary embodiment shown in FIGS. 15-18, housing 60 includes a plurality of segments 60A comprised of three subsections $60A_1$, $60A_2$, and $60A_3$. Each subsection is configured to operably connect with each adjacent subsection to form one or more housing cavities for receiving and retaining a stator (that is, a one or more stator plates 140, wire coils 34 wound about the stator plates, and magnets 32) to form a closed-loop passage 40. Each subsection may also be referred to as a coupling, as each of the subsections couple and form the housing. In the embodiment shown, each subsection of the segment 60A is substantially formed of an electrical and magnetic non-conducting material (that is, a non-electric and non-magnetic conducting or conductive material) to insulate the stator being housed therein. Each subsection may also be formed of a variable thickness, and may comprise wedge-shaped structures so to create a contoured or arcuate path for forming the closed-loop system.

Each subsection may be of the same or of a different design relative other subsections. Each subsection generally includes one or more cavities, and at least one for receiving the stator and/or the rotor-vessel. For example, with reference to FIGS. 15-18, subsections $60A_1$ and $60A_3$ are generally the same, and include a central aperture 160 configured to receive a stator and a plurality of surrounding apertures 168 for communicating fluid within the closed-loop system. Likewise, in certain embodiments, such exemplary shown in the figures, subsection $60A_2$ includes a plurality of intermediate apertures 166 and distal apertures 168 relative central aperture 164 for communicating fluid within the closed-loop system. In any subsection, fluid passages 170 may be arranged in any wall 182, 184, 186 defining the plurality of apertures 164, 166, 168 to communicate fluid between the apertures. While subsections $60A_1$ and $60A_3$ include a central aperture 160 for retaining a stator alone or in combination with an adjacent subsection, subsection $60A_2$ operates as a spacer separating adjacent stators contained in adjacent subsections. In the embodiment shown, central structure 184 prevents the receipt of a stator therein so to form the spacer between adjacent stators retained at least partially within adjacent subsections $60A_1$ and $60A_3$. The central structure 184, however, includes a cavity 164 forming a portion of the closed-loop passage in cooperation with aligned passages arranged within adjacent stators contained in subsections $60A_1$ and $60A_3$. In particular embodiments, cavity 164 includes bearing cavities configured to receive and retain any bearing contemplated herein. In forming a modular system, connections between adjacent subsections and segments may include sealing mechanisms to prevent the discharge of fluid from the housing. Any sealing mechanism may be employed, including, without limitation, any O-ring or gasket. Further, segments and subsections may be securely connected by latches, threading, fasteners, interlocking design, or any other known means of securing. Further, it is contemplated that in particular embodiments multiple systems 10, 10 may be employed and connected in series to generate increased power output.

It is also understood that each system 10, 10 may generate AC or DC power, and the power generated from each system may be converted from AC to DC or vice versa according to any known principles. For example, a commutator or silicon diodes may be employed to rectify AC to DC. Generation of AC or DC may also achieved by controlling whether the magnetic field remains fixed or is rotated relative to the coils. Accordingly, power generation system 10, 10 may comprise an alternator or a generator. In other exemplary embodiments, generation of AC or DC power is determined by the sequence and arrangement of the magnetic poles along the stack of magnets within the stator. For example, the alternating arrangement of the magnetic poles as shown in the figures generates AC electricity, while a non-alternating, common pole orientation of magnets (that is, where the polar arrangement of all magnets is the same) generates DC electricity.

In further embodiments, the present invention include methods of generating electricity using buoyancy principles. In particular embodiments, such methods comprise providing any buoyancy-driven power generation system contemplated herein. Further embodiments of such methods include at least partially filling a closed-loop passage of the system with a liquid. Yet further embodiments include injecting a fluid into a bottom location of the closed-loop passage, the fluid entering a fluid-retention cavity within the rotor-vessel such that the rotor-vessel translates vertically along the closed-loop path until reaching a top location of the closed-loop path, where the rotor-vessel translates downwardly along the closed-loop path after discharging the fluid from the fluid-retention cavity of the rotor-vessel. Subsequently, the prior steps are repeated for the other rotor-vessels of the plurality of rotor-vessels such that the plurality of rotor-vessels translate along the closed-loop passage to thereby generate a flow of electric current in the plurality of coils. In more particular embodiments, such methods further include directing the flow of current (electricity) to a device for storage or use. Even further, additional embodiments provide that the fluid is supplied by a fluid supply source. In such methods, the fluid supply source provides recycled fluid, which may comprise fluid reclaimed from the system. It is understood that any such method may also be performed in any manner discussed herein in association with the buoyancy-driven power generation system and its various embodiments described above and in association with the figures.

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A buoyancy-driven power generation system comprising:
   a closed-loop passage defined by a surrounding structure, the closed-loop passage arranged vertically to extend longitudinally along a closed-loop path, the passage configured to retain a liquid;
   a plurality of rotor-vessels slidingly arranged within the closed-loop passage and configured to translate along the closed-loop path within the closed-loop passage, each of the plurality of rotor-vessels including a fluid-retention cavity formed in a body of the rotor-vessel and having a density greater than a liquid in which the plurality of rotor-vessels will be submerged for power generation operations;
   a plurality of magnets and a plurality of wire coils arranged along the closed-loop passage and configured to generate a flow of current as the plurality of rotor-vessels translate along the closed-loop passage;
   a gas inlet arranged near a bottom of the closed-loop passage, the gas inlet both configured for operable communication with a gas source and to dispense a gas received from the gas source into a bottom of closed-loop passage for reception by each of the plurality of fluid-retention rotor-vessels.

2. The system of claim 1, where the rotor-vessels are independently arranged within the closed-loop passage.

3. The system of claim 2, wherein the plurality of magnets are statically arranged along the closed-loop passage.

4. The system of claim 1, where the plurality of wire coils are statically arranged along the closed-loop passage in close-relation to the plurality of magnets.

5. The system of claim 4, wherein the plurality of magnets are arranged in a stacked grouping, each of the plurality of magnets having a north and a south pole such that the plurality of magnets are arranged to provide an alternating north-south arrangement of north and south poles in the stacked grouping of magnets.

6. The system of claim 5, where the plurality of magnets form a plurality of stacked groupings of magnets arranged in a spaced-relation along the closed-loop passage.

7. The system of claim 1, where the surrounding structure defining the closed-loop passage includes a plurality of plates formed of a magnetically conductive material and each having a passage-forming aperture, the plurality of plates being arranged into a stacked grouping of plates such that the passage-forming aperture of each plate is aligned with the passage-forming aperture of the other plates in the stacked grouping to form at least a portion of the closed-loop passage.

8. The system of claim 7, where each of the stacked plates are laminated with a water-proof coating.

9. The system of claim 7, where one or more of the plurality of wire coils are wound around two or more of the stacked plates forming the stacked group of plates.

10. The system of claim 9, where a plurality of the stacked grouping of plates are arranged in spaced-relation along the closed-loop passage.

11. The system of claim 7, where each of the plurality of plates forming the stacked grouping of plates forming the closed-loop passage includes one or more magnetic field flow members forming a structural magnetic field flow path between at least two of the plurality of magnets arranged within the corresponding plate of the plurality of plates.

12. The system of claim 11, where the one or more magnetic field flow members also extends through one or more wire coils wound around a portion of the corresponding plate of the plurality of plates.

13. The system of claim 7, where each of the plurality of plates includes one or more magnet-receiving apertures, each of the one or more magnet-receiving apertures including at least one of the magnets of the plurality of magnets.

14. The system of claim 7, where each of the plurality of plates includes one or more coil-receiving apertures, each of the one or more liquid-receiving apertures including at least one of the plurality of wire coils wound around two or more of the stacked plates.

15. The system of claim 1, where each of the plurality of plates includes one or more bearing-receiving apertures, each of the one or more bearing-receiving apertures including at least one of a plurality of bearings arranged along and partially within the closed-loop passage.

16. The system of claim 1, where a plurality of bearings are arranged between the closed-loop passage and the plurality of rotor-vessels.

17. The system of claim 1, where each of the plurality of rotor-vessels is formed of a plurality of plates formed of electrically insulating material and arranged in a stacked arrangement of vessel plates.

18. The system of claim 17, where each of the plurality of plates forming the stacked grouping of vessel plates includes one or more magnetic field flow members forming a structural magnetic field flow path extending between two magnets arranged within the surrounding structure defining the closed-loop passage.

19. The system of claim 18, where each of the magnetic field flow members extends across a portion of the fluid-retention cavity of each corresponding rotor-vessel.

20. The system of claim 19, where the one or more magnetic field flow members extend along an outer perimeter of the rotor-vessel, the system further comprising one or more interior magnetic field flow members extending into the across a portion of the fluid-retention cavity of each corresponding rotor-vessel.

21. The system of claim 1, where the stacked arrangement of vessel plates includes one or more spacers formed of electrically insulating material and arranged within the stacked arrangement separating one or more of the plurality of plates of the stacked arrangement.

22. The system of claim 1, where each of the plurality of rotor-vessels is formed of a plurality of plates formed of electrically insulating material and arranged in a stacked arrangement of vessel plates, where each of the plurality of plates forming the stacked grouping of vessel plates includes one or more magnetic field flow members forming a structural magnetic field flow path extending between two magnets arranged within the surrounding structure defining the closed-loop passage.

23. A method of generating electricity using buoyancy principles, the method comprising:
providing the system of claim 1;
at least partially filling the closed-loop passage with a liquid;
injecting a fluid into a bottom location of the closed-loop passage, the fluid entering a fluid-retention cavity within the rotor-vessel such that the rotor-vessel translates vertically along the closed-loop path until reaching a top location of the closed-loop path, where the rotor-vessel translates downwardly along the closed-loop path after discharging the fluid from the fluid-retention cavity of the rotor-vessel;
repeating the prior step for the other rotor-vessels of the plurality of rotor-vessels such that the plurality of rotor-vessels translate along the closed-loop passage to thereby generate a flow of electric current in the plurality of coils.

24. The method of claim 23 further comprising the step of:
directing the flow of current to a device for storage or use.

25. The method of claim 23, where the fluid is supplied by a fluid supply source and the fluid supply source provides recycled fluid.

\* \* \* \* \*